US012725884B2

(12) United States Patent
Hotta et al.

(10) Patent No.: US 12,725,884 B2
(45) Date of Patent: Sep. 1, 2026

(54) SECONDARY BATTERY, BATTERY PACK, VEHICLE, AND STATIONARY POWER SUPPLY

(71) Applicant: KABUSHIKI KAISHA TOSHIBA, Tokyo (JP)

(72) Inventors: Yasuyuki Hotta, Tokyo (JP); Keigo Hoshina, Yokohama Kanagawa (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 534 days.

(21) Appl. No.: 18/458,763

(22) Filed: Aug. 30, 2023

(65) Prior Publication Data

US 2024/0291107 A1 Aug. 29, 2024

(30) Foreign Application Priority Data

Feb. 24, 2023 (JP) ................................. 2023-027399

(51) Int. Cl.
*H01M 50/451* (2021.01)
*H01M 4/02* (2006.01)
(Continued)

(52) U.S. Cl.
CPC ......... *H01M 50/451* (2021.01); *H01M 4/366* (2013.01); *H01M 10/0525* (2013.01);
(Continued)

(58) Field of Classification Search
CPC ............... H01M 50/451; H01M 4/366; H01M 10/0525; H01M 50/491; H01M 2004/027;
(Continued)

(56) References Cited

U.S. PATENT DOCUMENTS 6,403,253 B1 6/2002 Wainwright et al.
10,756,392 B2 8/2020 Seki et al.
(Continued)

FOREIGN PATENT DOCUMENTS

JP H9-508490 A 8/1997
JP 2000-77073 A 3/2000
(Continued)

OTHER PUBLICATIONS

Bongki Son et al., "Measurement and Analysis of Adhesion Property of Lithium-Ion Battery Electrodes with SAICAS," ACS Appl. Mater. Interfaces, vol. 6, pp. 526-531 (2014).
(Continued)

*Primary Examiner* — Chinyere Mpamugo
(74) *Attorney, Agent, or Firm* — Finnegan, Henderson, Farabow, Garrett & Dunner, LLP

(57) ABSTRACT

According to one embodiment, a secondary battery provided with a negative electrode including a negative electrode active material-containing layer, a positive electrode including a positive electrode active material-containing layer, a separator located between the negative electrode and the positive electrode, and an aqueous electrolyte is provided. The separator includes a composite layer containing inorganic solid particles and a polymeric material. A particle size distribution of the inorganic solid particles in the composite layer has at least two peaks. A frequency $FP_S$ of a peak top $P_S$ of a peak on a smallest particle diameter side and a frequency $FP_L$ of a peak top $P_L$ of a peak on a largest particle diameter side in the particle size distribution have a relationship of $0.9 \leq FP_S/FP_L \leq 5$. A porosity of the composite layer is less than both of a porosity of the negative electrode active material-containing layer and a porosity of the positive electrode active material-containing layer, and is 1% or more and less than 15%.

12 Claims, 10 Drawing Sheets

(51) Int. Cl.
*H01M 4/36* (2006.01)
*H01M 10/0525* (2010.01)
*H01M 50/491* (2021.01)

(52) U.S. Cl.
CPC .... *H01M 50/491* (2021.01); *H01M 2004/027* (2013.01); *H01M 2004/028* (2013.01); *H01M 2220/20* (2013.01)

(58) Field of Classification Search
CPC ....... H01M 2004/028; H01M 2220/20; H01M 4/131; H01M 4/525; H01M 10/36; H01M 2004/021; H01M 2300/0002; Y02E 60/10
See application file for complete search history.

(56) References Cited

U.S. PATENT DOCUMENTS

| | | | | |
|---|---|---|---|---|
| 2016/0359194 | A1* | 12/2016 | Meguro ............ | H01M 10/0562 |
| 2017/0222272 | A1 | 8/2017 | Takami et al. | |
| 2017/0271682 | A1 | 9/2017 | Matsuno et al. | |
| 2017/0271717 | A1 | 9/2017 | Yamashita et al. | |
| 2018/0083321 | A1 | 3/2018 | Hotta et al. | |
| 2018/0269534 | A1 | 9/2018 | Hotta et al. | |
| 2018/0269537 | A1 | 9/2018 | Yoshima et al. | |
| 2018/0277813 | A1 | 9/2018 | Yoshima et al. | |
| 2018/0277899 | A1 | 9/2018 | Takami et al. | |
| 2019/0089011 | A1 | 3/2019 | Seki et al. | |
| 2020/0203722 | A1 | 6/2020 | Hotta et al. | |
| 2021/0083251 | A1 | 3/2021 | Hotta et al. | |
| 2021/0091358 | A1 | 3/2021 | Uno et al. | |
| 2021/0091416 | A1 | 3/2021 | Seki et al. | |
| 2022/0037741 | A1 | 2/2022 | Lee et al. | |
| 2022/0085457 | A1* | 3/2022 | Hotta .................... | H01M 4/661 |
| 2022/0294077 | A1 | 9/2022 | Hotta et al. | |

FOREIGN PATENT DOCUMENTS

| | | | |
|---|---|---|---|
| JP | 2003-17057 | A | 1/2003 |
| JP | 2005-71807 | A | 3/2005 |
| JP | 2010-56027 | A | 3/2010 |
| JP | 2018-160443 | A | 10/2018 |
| JP | 2018-163893 | A | 10/2018 |
| JP | 2019-57373 | A | 4/2019 |
| JP | 6774378 | B2 | 10/2020 |
| JP | 2022-47743 | A | 3/2022 |
| JP | 2023-41298 | A | 3/2023 |
| KR | 20200078011 | A | 7/2020 |

OTHER PUBLICATIONS

Chieko Narita et al., “Study on the Appearance and Peel Strength of Byakudan-Nuri Works,” Materials Sciences and Applications, vol. 5, pp. 81-85 (2014).
Kyuman Kim et al., “Three-Dimensional Adhesion Map Based on Surface and Interfacial Cutting Analysis System for Predicting Adhesion Properties of Composite Electrodes,” ACS Appl. Mater. Interfaces, vol. 8, pp. 23688-23695 (2016).
S. Liu et al., “Rechargeable Aqueous Lithium-Ion Battery of $TiO_2$ /$LiMn_2$ $O_4$ with a High Voltage,” J. of The Electrochemical Soc., vol. 158, pp. A1490-A1497 (2011).
Yasuyuki Hotta et al., U.S. Appl. No. 17/822,564, filed Aug. 26, 2022.
Japan Patent Office, Office Action in JP Application No. 2023-027399 (Jan. 13, 2026).

* cited by examiner 22a
342
22
342a
100
346
350
348a
100
100
352
35
PROTECTION CIRCUIT
100
353
348b
343a
THERMISTOR
100
345
343
23
23a
24
200
34

SECONDARY BATTERY, BATTERY PACK, VEHICLE, AND STATIONARY POWER SUPPLY

CROSS-REFERENCE TO RELATED APPLICATION(S)

This application is based upon and claims the benefit of priority from Japanese Patent Application No. 2023-027399, filed Feb. 24, 2023, the entire contents of which are incorporated herein by reference.

FIELD

Embodiments described herein relate generally to a secondary battery, a battery pack, a vehicle, and a stationary power supply.

BACKGROUND

Non-aqueous electrolyte batteries such as lithium ion batteries are used as power supplies in a wide range of fields. The form of the non-aqueous electrolyte battery ranges from a small one for various electronic apparatus and the like to a large one for electric automobiles and the like. Non-aqueous electrolyte batteries require that certain safety measures be taken because they use a non-aqueous electrolyte containing a combustible substance such as ethylene carbonate.

Development of an aqueous electrolyte battery using an aqueous electrolyte containing a non-flammable aqueous solvent instead of a non-aqueous electrolyte is underway.

DETAILED DESCRIPTION

Figure 1:
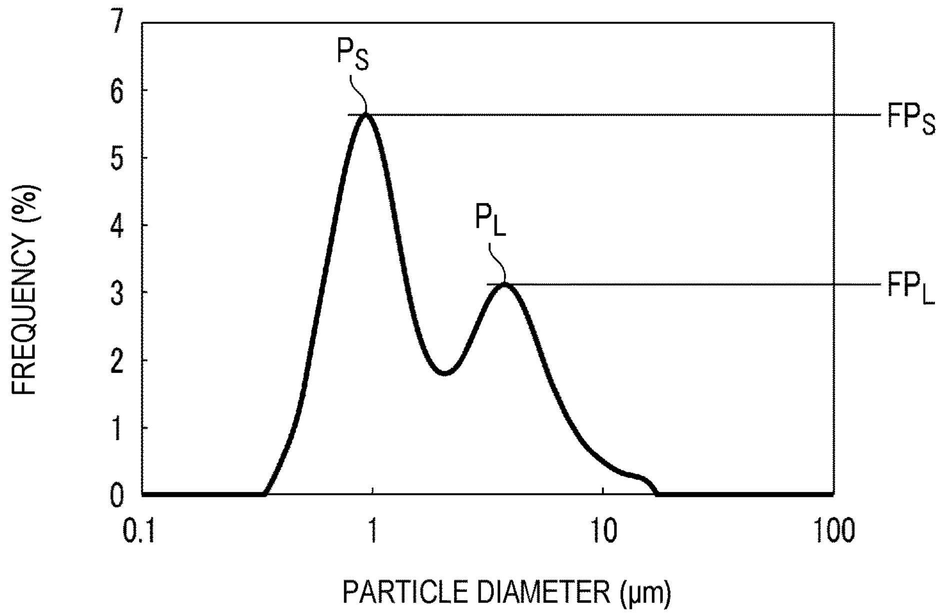
FIG. 1 is a graph showing an example of a particle size distribution of a composite layer that may be provided in a secondary battery according to an embodiment.

Embodiments provide a secondary battery and a battery pack exhibiting high charge/discharge efficiency and high lifetime performance, and a vehicle and a stationary power supply including the battery pack.

In general, according to one embodiment, a secondary battery provided with a negative electrode including a negative electrode active material-containing layer, a positive electrode including a positive electrode active material-containing layer, a separator located between the negative electrode and the positive electrode, and an aqueous electrolyte is provided. The separator includes a composite layer containing electrically insulating inorganic solid particles and a polymeric material. A particle size distribution of the inorganic solid particles in the composite layer has at least two peaks. A frequency $FP_S$ of a peak top $P_S$ of a peak on a smallest particle diameter side and a frequency $FP_L$ of a peak top $P_L$ of a peak on a largest particle diameter side in the particle size distribution have a relationship of $0.9 \leq FP_S/FP_L \leq 5$. A porosity of the composite layer is less than both of a porosity of the negative electrode active material-containing layer and a porosity of the positive electrode active material-containing layer, and is 1% or more and less than 15%.

According to another embodiment, a battery pack including the secondary battery according to the above-mentioned embodiment is provided.

According to still another embodiment, a vehicle including the battery pack according to the above-mentioned embodiment is provided.

According to yet still another embodiment, a stationary power supply including the battery pack according to the above-mentioned embodiment is provided.

In general, a potential window of an aqueous electrolyte is narrower than a potential window of a non-aqueous electrolyte. Therefore, in an aqueous electrolyte battery, depending on the combination of the positive electrode and the negative electrode, water in the aqueous electrolyte may be electrolyzed during initial charge. For example, in an aqueous electrolyte battery using a material that works at a relatively low potential, such as lithium titanate ($Li_4Ti_5O_{12}$) having a spinel structure, as the negative electrode active material, when the battery is operated, electrolysis of water occurs on the surface of the negative electrode, and charge/discharge efficiency may deteriorate, or self-discharge may occur. In addition, the electrolysis of water involves a reduction reaction of protons (hydrogen cations; $H^+$) that generate hydrogen ($H_2$), and therefore, safety may deteriorate. Accordingly, a separator used in an aqueous electrolyte battery is required to reduce contact of water with the electrode, that is, required to be dense enough to exhibit high water impermeability.

In each of a secondary battery using lithium metal or zinc metal for an electrode, and a secondary battery using an electrolyte containing lithium ions or zinc ions, a deposit such as a lithium dendrite or a zinc dendrite may be generated on the electrode by charge and discharge. When such a dendrite breaks through the separator, an internal short circuit may occur. In order also to make it difficult for such a dendrite to break through, the separator is required to be dense.

Examples of the separator having a particularly high denseness include a solid electrolyte film. The solid electrolyte film is a film including only solid electrolyte particles having ion conduction properties. The solid electrolyte film is impermeable to a solvent and selectively permeable only to specific ions, and thus has complete water impermeability. However, the solid electrolyte film has low flexibility, and therefore does not have sufficient durability. In addition, in order to use the solid electrolyte film as the separator, a certain thickness or more is needed, and therefore, it is difficult to increase the energy density of the battery.

In order to solve this problem, a polymer composite film in which solid electrolyte particles are bonded together with a polymeric material is proposed. The polymer composite film does not show as much water impermeability as the solid electrolyte film, but has a high denseness and can be impregnated with a small amount of an aqueous electrolyte. In addition, the polymer composite film has excellent flexibility as compared with the solid electrolyte film and also enables thinning.

First Embodiment

According to a first embodiment, a secondary battery is provided. The secondary battery includes a negative electrode, a positive electrode, a separator, and an aqueous electrolyte. The separator is located between the negative electrode and the positive electrode. The separator includes a composite layer containing inorganic solid particles and a polymeric material. A particle size distribution of the inorganic solid particles in the composite layer has at least two peaks. A frequency $FP_S$ of a peak top $P_S$ of a peak on a smallest particle diameter side and a frequency $FP_L$ of a peak top $P_L$ of a peak on a largest particle diameter side in the particle size distribution have a relationship of $0.9 \le FP_S/FP_L \le 5$. The negative electrode includes a negative electrode active material-containing layer, and the positive electrode includes a positive electrode active material-containing layer. A porosity of the composite layer is less than both of a porosity of the negative electrode active material-containing layer and a porosity of the positive electrode active material-containing layer. Further, the porosity of the composite layer is 1% or more and less than 15%.

FIG. 1 shows an example of the particle size distribution as described above. FIG. 1 is a graph showing an example of the particle size distribution of the composite layer that may be provided in the secondary battery according to the embodiment. The particle size distribution can be determined by a laser diffraction scattering method, and represents the volume frequency (%) for each particle diameter in the inorganic solid particles contained in the composite layer. The illustrated particle size distribution curve has two peaks. The horizontal position of the peak top $P_S$ of the peak on the small particle diameter side is 0.7 μm, and the horizontal position of the peak top $P_L$ of the peak on the large particle diameter side is 3 μm. The ratio ($FP_S/FP_L$) of the volume frequency $FP_S$ of inorganic solid particles having a particle diameter (0.7 μm) corresponding to the peak top $P_S$ to the volume frequency $FP_L$ of inorganic solid particles having a particle diameter (3 μm) corresponding to the peak top $P_L$ is 1.8.

In the secondary battery having the above-mentioned configuration, a composite layer that functions as the separator separating the negative electrode and the positive electrode is provided therebetween. The composite layer contains inorganic solid particles and a polymeric material, and may be, for example, a polymer composite film. The particle size distribution of the inorganic solid particles contained in the composite layer is bimodal or more multimodal, that is, it has two or more modes (peaks). Between the mode located on the smallest particle diameter side and the mode located on the largest particle diameter side among a plurality of modes (peaks), the ratio of the maximum value of the volume-based frequency ($FP_S/FP_L$) is 0.9 or more and 5 or less. In the composite layer containing particles having a small particle diameter and particles having a large particle diameter at a ratio that gives such a particle size distribution, the bending degree of a flow channel formed by gaps between the particles is high. That is, there are many bends in a path through which water molecules and protons can move within the composite layer. As a result, the amount of movement of water molecules and protons can be reduced, so that the supply of a reactant thereof in the electrolysis reaction to the negative electrode can be reduced, and water decomposition at the negative electrode can be reduced. Therefore, this secondary battery can exhibit high charge/discharge efficiency. In addition, the secondary battery can exhibit high lifetime performance.

Figure 2:
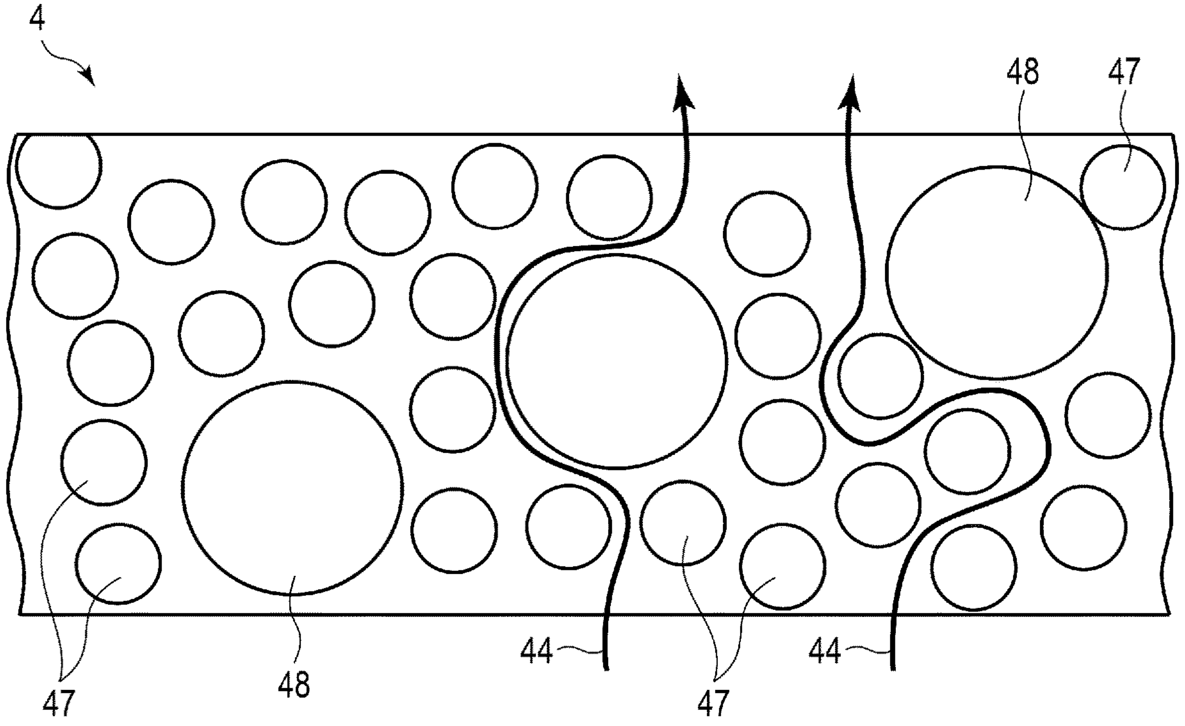
FIG. 2 is a sectional view schematically showing an example of the composite layer that may be provided in the secondary battery according to the embodiment.

Description will now be made with reference to the drawings. FIG. 2 is a sectional view schematically showing an example of the composite layer that may be provided in a secondary battery according to the embodiment. A composite layer 4 includes inorganic solid particles 47 having a small particle diameter, inorganic solid particles 48 having a large particle diameter, and a polymeric material (not shown) as a binder. In the composite layer 4 in which the particle size distribution of the inorganic solid particles 47 and 48 is bimodal in this manner, the bending degree of the flow channel formed of a continuous pore formed in gaps between the inorganic solid particles 47 and 48 bonded to each other by the polymeric material is high. Therefore, the distance of a route 44 for water molecules and protons to pass in the composite layer 4 becomes longer, and the moving speed of water molecules and protons in the composite layer 4 is reduced. Although not shown in FIG. 2, gaps between the inorganic solid particles 47 and 48 are partially filled with the polymeric material, so that not all the gaps between the particles directly form a flow channel.

Figure 3:
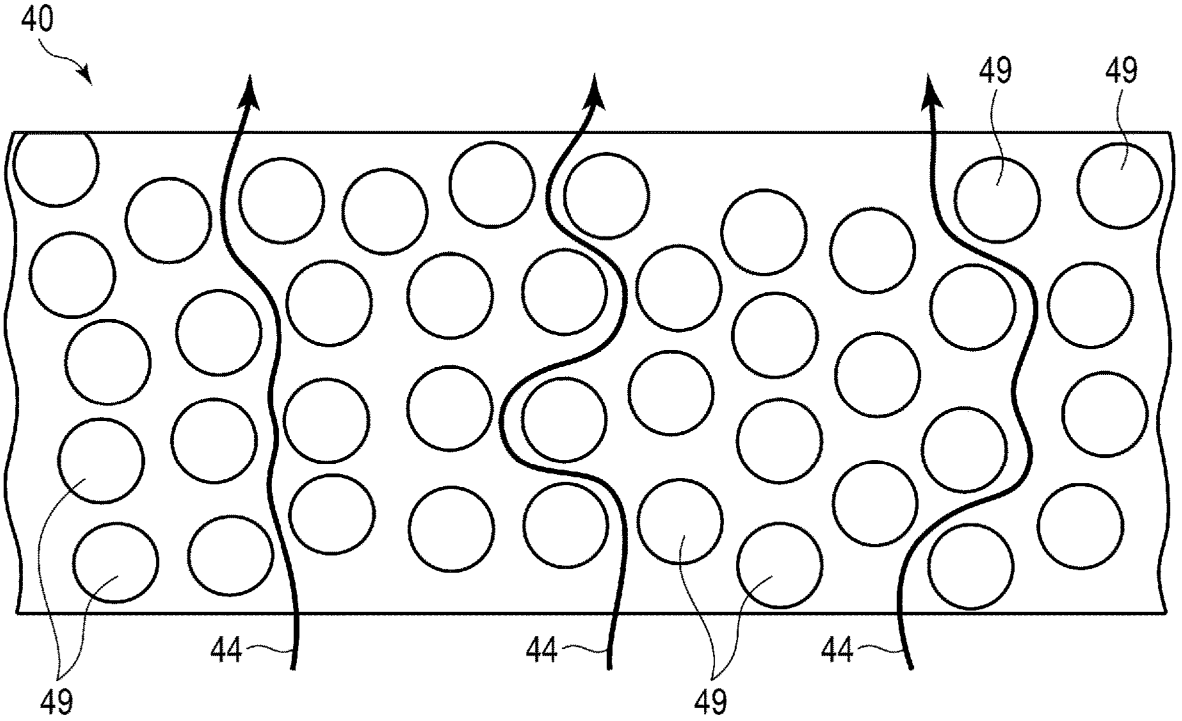
FIG. 3 is a sectional view schematically showing an example of a composite layer of a related art.

For comparison, an example of a composite layer of a related art is schematically shown in FIG. 3. In a composite layer 40 of a related art having a monomodal particle size distribution, the particle diameter of inorganic solid particles 49 in the composite layer 40 remains approximately the same, although there are some variations in particle diameter. Therefore, although the denseness can be increased by using fine particles, the bending degree of the flow channel formed between the particles does not increase. Accordingly, the distance of the route 44 for water molecules and protons to move in the composite layer 40 cannot be increased.

The negative electrode, the positive electrode, and the separator may form an electrode group. The aqueous electrolyte may be held in the electrode group.

A secondary battery according to an embodiment may be, for example, a lithium ion secondary battery or a sodium ion secondary battery. Further, the secondary battery may include an aqueous electrolyte secondary battery containing an aqueous electrolyte.

Such a secondary battery can further include an exterior member that houses the electrode group and the aqueous electrolyte.

Such a secondary battery can further include a negative electrode terminal electrically connected to the negative electrode and a positive electrode terminal electrically connected to the positive electrode.

The composite layer can be joined to at least one of the negative electrode and the positive electrode. For example, the composite layer may be formed on a surface of the negative electrode to form the separator. Alternatively, the composite layer may be formed on a surface of the positive electrode to form the separator. The composite layer may be formed on a surface of each of the negative electrode and the positive electrode. Alternatively, a single composite layer may be joined to both the negative electrode and the positive electrode.

The secondary battery may further include another separator independent of the separator including the composite layer. The other separator may be provided, for example, between the composite layer and the negative electrode, or between the composite layer and the positive electrode. The secondary battery can include a plurality of composite layers, and for example, one composite layer, another separator, and one more composite layer may be arranged in this order between the negative electrode and the positive electrode. The other separator may be impregnated with the aqueous electrolyte.

The negative electrode, the positive electrode, the separator (the composite layer, and optionally another separator), the aqueous electrolyte, the exterior member, the negative electrode terminal, and the positive electrode terminal will be described in detail below.

(Negative Electrode)

The negative electrode includes a negative electrode active material-containing layer. The negative electrode active material-containing layer contains a negative electrode active material, and optionally an electrically conductive agent and a binder.

The negative electrode can further include a negative electrode current collector. The negative electrode active material-containing layer may be provided, for example, on at least one surface of the negative electrode current collector. The negative electrode active material-containing layer may be provided on one main surface of the negative electrode current collector, and the negative electrode active material-containing layer may be placed on one main surface on the negative electrode current collector and a main surface on the back side thereof.

The negative electrode active material-containing layer desirably contains, as an active material, a negative electrode active material containing a compound having a lithium ion intercalation/deintercalation potential of 1 V or more and 3 V or less (vs. $Li/Li^+$) with respect to the lithium redox potential.

In an aqueous electrolyte battery including a negative electrode containing a compound having a lithium ion intercalation/deintercalation potential within the above-mentioned range as a negative electrode active material, during initial charge, water contained in the solvent of the aqueous electrolyte may be electrolyzed inside and near the negative electrode. This is because intercalation of lithium ions into the negative electrode active material during initial charge lowers the potential of the negative electrode. When the potential of the negative electrode falls below the hydrogen generation potential, water is partially decomposed into hydrogen ($H_2$) and hydroxide ions ($OH^-$) inside and near the negative electrode. This increases the pH of the aqueous electrolyte present inside and near the negative electrode.

The hydrogen generation potential at the negative electrode depends on the pH of the aqueous electrolyte. That is, when the pH of the aqueous electrolyte in contact with the negative electrode increases, the hydrogen generation potential at the negative electrode decreases. In a battery using the negative electrode active material in which the lower limit of the lithium ion intercalation/deintercalation potential is 1 V or more (vs. $Li/Li^+$), although the potential of the negative electrode is lower than the hydrogen generation potential during initial charge, the potential of the negative electrode tends to be higher than the hydrogen generation potential after initial charge, so that decomposition of water at the negative electrode is less likely to occur.

Examples of the compound having a lithium ion intercalation/deintercalation potential of 1 V or more and 3 V or less (vs. $Li/Li^+$) based on the lithium redox potential include a titanium oxide and a titanium-containing oxide.

Examples of the titanium-containing oxide include a lithium-titanium composite oxide, a niobium titanium-based oxide, and a sodium niobium titanium-based oxide. The negative electrode active material can contain one or more titanium oxides and titanium-containing oxides.

Examples of the titanium oxide include a titanium oxide having a monoclinic structure, a titanium oxide having a rutile structure, and a titanium oxide having an anatase structure. As for the titanium oxide having each of the crystal structures, the composition before charge can be represented by $TiO_2$ and the composition after charge can be represented by $Li_xTiO_2$ (the subscript x is $0 \le x \le 1$). Further, the structure of the titanium oxide having a monoclinic structure before charge can be represented by $TiO_2$ (B).

Examples of the lithium titanium oxide include a lithium titanium oxide having a spinel structure (for example, a compound represented by a general formula: $Li_{4+x}Ti_5O_{12}$ where $-1 \le x \le 3$); and a lithium titanium oxide having a ramsdellite structure (for example, a compound represented by $Li_{2+x}Ti_3O_7$ where $-1 \le x \le 3$, a compound represented by $Li_{1+x}Ti_2O_4$ where $0 \le x \le 1$, a compound represented by $Li_{1.1+x}Ti_{1.8}O_4$ where $0 \le x \le 1$, a compound represented by $Li_{1.07+x}Ti_{1.86}O_4$ where $0 \le x \le 1$, and a compound represented by $Li_xTiO_2$ where $0 < x \le 1$). The lithium titanium oxide may also be a lithium-titanium composite oxide into which a heteroatom is introduced.

Examples of a monoclinic niobium titanium-based oxide include a compound represented by $Li_xTi_{1-y}M1_yNb_{2-z}M2_zO_{7+\delta}$. Here, M1 is at least one element selected from the group consisting of Zr, Si, and Sn. M2 is at least one element selected from the group consisting of V, Ta, and Bi. The respective subscripts in the compositional formula are as follows: $0 \le x \le 5$, $0 \le y < 1$, $0 \le z < 2$, and $-0.3 \le \delta \le 0.3$. Specific examples of the monoclinic niobium titanium-based oxide include $Li_xNb_2TiO_7$ ($0 \le x \le 5$).

Other examples of the monoclinic niobium titanium-based oxide include a compound represented by $Li_xTi_{1-y}M_{3y+z}Nb_{2-z}O_{7-\delta}$. Here, M3 is at least one element selected from the group consisting of Mg, Fe, Ni, Co, W, Ta, and Mo. The respective subscripts in the compositional formula are as follows: $0 \le x \le 5$, $0 \le y < 1$, $0 \le z < 2$, and $-0.3 \le \delta \le 0.3$.

Examples of the sodium niobium titanium-based oxide include an orthorhombic Na-containing niobium-titanium composite oxide represented by a general formula: $Li_{2+x}Na_{2-a}M4_bTi_{6-c-d}Nb_cM5_dO_{14+\delta}$ where $0 \le x \le 4$, $0 \le a < 2$, $0 \le b < 2$, $0 < c < 6$, $0 \le d < 3$, $c+d < 6$, $-0.5 \le \delta \le 0.5$, M4 contains one or more elements selected from the group consisting of Cs, K, Sr, Ba, and Ca, and M5 contains one or more elements selected from the group consisting of Zr, Sn, V, Ta, Mo, W, Fe, Co, Mn, and Al.

As the negative electrode active material, it is preferred to use a titanium oxide having an anatase structure, a titanium oxide having a monoclinic structure, a lithium titanium oxide having a spinel structure, a niobium titanium-based oxide, or a mixture thereof. On the other hand, when a titanium oxide having an anatase structure, a titanium oxide having a monoclinic structure, or a lithium titanium oxide having a spinel structure is used as the negative electrode active material, for example, a high electromotive force can be obtained by combination with the positive electrode using a lithium-manganese composite oxide as the positive electrode active material. On the other hand, a high capacity can be exhibited by using a niobium titanium-based oxide.

The negative electrode active material may be contained in the active material-containing layer in the form of, for example, particles. The negative electrode active material particles may be primary particles, secondary particles that are aggregates of primary particles, or a mixture of single primary particles and secondary particles. The shape of the particle is not particularly limited, and may be, for example, a spherical shape, an elliptical shape, a flat shape, a fibrous shape, or the like.

The average particle size (diameter) of the secondary particles of the negative electrode active material is preferably 3 μm or more, and more preferably 5 μm or more and 20 μm or less. Within this range, the surface area of the active material is small, and therefore, decomposition of water can be further reduced.

The average particle diameter of the primary particles of the negative electrode active material is desirably 1 μm or less. This shortens the diffusion distance of Li ions inside the active material and increases the specific surface area. Therefore, excellent high input performance (rapid charge) is obtained. Further, the average particle diameter of the primary particles of the negative electrode active material is preferably 0.001 μm or more. The average particle diameter of the primary particles of the negative electrode active material is more preferably 0.1 μm or more and 0.8 μm or less.

The primary particle diameter and the secondary particle diameter mean a particle diameter at which a volume integrated value is 50% in the particle size distribution determined by a laser diffraction-type particle size distribution analyzer. The details of measurement of the particle size distribution by a laser diffraction method will be described later.

The porosity of the negative electrode active material-containing layer is desirably 5% or more and 50% or less. Thereby, a negative electrode having excellent affinity for the aqueous electrolyte and a high density can be obtained. The porosity of the negative electrode active material-containing layer is more preferably 8% or more and 40% or less. A method for measuring the porosity of the active material-containing layer will be described later.

The electrically conductive agent is blended to enhance the current collection performance and reduce the contact resistance between the active material and the current collector. Examples of the electrically conductive agent include vapor grown carbon fiber (VGCF), carbon black such as acetylene black, and a carbonaceous material such as graphite. In addition, a fibrous carbon material such as carbon nanotubes and carbon nanofibers can be used as the electrically conductive agent. One of these materials may be used as the electrically conductive agent, or two or more materials may be used in combination as the electrically conductive agent. Alternatively, instead of using the electrically conductive agent, the surfaces of the active material particles may be coated with a carbon coating or an electronically conductive inorganic material coating.

The binder has a function of binding the negative electrode active material and the electrically conductive agent. As the binder, for example, at least one compound selected from the group consisting of polytetrafluoroethylene (PTFE), polyvinylidene fluoride (PVdF), a cellulosic polymer such as carboxymethyl cellulose (CMC), a fluororubber, a styrene-butadiene rubber, an acrylic resin or a copolymer thereof, polyacrylic acid, or polyacrylonitrile can be used, but the binder is not limited thereto. For example, the polymeric material contained in the composite layer can be used as the binder. Use of the same material as the polymeric material used for the composite layer as the binder used for the negative electrode active material-containing layer can improve the bonding degree when both are joined to each other. The details of the polymeric material of the composite layer will be described later. As the binder, one type may be used or two or more types may be mixed and used.

The blending ratios of the negative electrode active material, the electrically conductive agent, and the binder in the negative electrode active material-containing layer are preferably 70 mass % or more and 95 mass % or less of the negative electrode active material, 3 mass % or more and 20 mass % or less of the electrically conductive agent, and 2 mass % or more and 10 mass % or less of the binder. When the blending ratio of the electrically conductive agent is 3 mass % or more, the current collection performance of the negative electrode active material-containing layer can be improved. Further, when the blending ratio of the binder is 2 mass % or more, a sufficient electrode strength is obtained. The binder may function as an insulator. Therefore, when the blending ratio of the binder is 10 mass % or less, an insulating portion in the electrode can be reduced.

As a material of the negative electrode current collector, a material that is electrochemically stable in the electrode potential range when alkali metal ions are intercalated or deintercalated is used. The negative electrode current collector may be, for example, a zinc foil, an aluminum foil, or an aluminum alloy foil containing one or more elements selected from magnesium (Mg), titanium (Ti), zinc (Zn), manganese (Mn), iron (Fe), copper (Cu), and silicon (Si), and is preferably surface-coated with a metal having a high hydrogen overvoltage such as Zn or Sn. Examples of the form of the negative electrode current collector include a porous body and a mesh in addition to the foil. In order to improve the energy density and output, a foil form with a small volume and a large surface area is desirable.

The thickness of the negative electrode current collector is preferably 5 μm or more and 20 μm or less. The negative electrode current collector having such a thickness can balance the strength and weight reduction of the electrode.

In addition, the current collector can include a portion where the negative electrode active material-containing layer is not formed on the surface thereof. This portion can serve as a negative electrode current collector tab. Alternatively, a negative electrode current collector tab separate from the negative electrode current collector may be electrically connected to the negative electrode.

(Positive Electrode)

The positive electrode includes a positive electrode active material-containing layer. The positive electrode can further include a positive electrode current collector. The positive electrode active material-containing layer may be formed on one surface or both surfaces of the positive electrode current collector. The positive electrode active material-containing layer can contain a positive electrode active material, and optionally an electrically conductive agent and a binder.

As the positive electrode active material, for example, an oxide or a sulfide can be used. The positive electrode may contain one type of compound alone or may contain two or more types of compounds in combination as the positive electrode active material. Examples of the oxide and the sulfide include a compound capable of intercalating and deintercalating Li or Li ions.

Examples of such a compound include manganese dioxide ($MnO_2$), iron oxide, copper oxide, nickel oxide, a lithium-manganese composite oxide (for example, $Li_xMn_2O_4$ or $Li_xMnO_2$; $0<x\leq 1$), a lithium-nickel composite oxide (for example, $Li_xNiO_2$; $0<x\leq 1$), a lithium-cobalt composite oxide (for example, $Li_xCoO_2$; $0<x\leq 1$), a lithium-nickel-cobalt composite oxide (for example, $Li_xNi_{1-y}Co_yO_2$; $0<x\leq 1$, $0<y<1$), a lithium-manganese-cobalt composite oxide (for example, $Li_xMn_yCo_{1-y}O_2$; $0<x\leq 1$, $0<y<1$), a lithium-manganese-nickel composite oxide having a spinel structure (for example, $Li_xMn_{2-y}Ni_yO_4$; $0<x\leq 1$, $0<y<2$), a lithium phosphorus oxide having an olivine structure (for example, $Li_xFePO_4$; $0<x\leq 1$, $Li_xFe_{1-y}Mn_yPO_4$; $0<x\leq 1$, $0<y\leq 1$, $Li_xCoPO_4$; $0<x\leq 1$), iron sulfate ($Fe_2(SO_4)_3$), vanadium oxide (for example, $V_2O_5$), and a lithium-nickel-cobalt-manganese composite oxide ($Li_xNi_{1-y-z}Co_yMn_zO_2$; $0<x\leq 1$, $0<y<1$, $0<z<1$, $y+z<1$).

Among the above-mentioned compounds, examples of a more preferred compound as the positive electrode active material include a lithium-manganese composite oxide having a spinel structure (for example, $Li_xMn_2O_4$; $0<x\leq 1$), a lithium-nickel composite oxide (for example, $Li_xNiO_2$; $0<x\leq 1$), a lithium-cobalt composite oxide (for example, $Li_xCoO_2$; $0<x\leq 1$), a lithium-nickel-cobalt composite oxide (for example, $Li_xNi_{1-y}Co_yO_2$; $0<x\leq 1$, $0<y<1$), a lithium-manganese-nickel composite oxide having a spinel structure (for example, $Li_xMn_{2-y}Ni_yO_4$; $0<x\leq 1$, $0<y<2$), a lithium-manganese-cobalt composite oxide (for example, $Li_xMn_yCo_{1-y}O_2$; $0<x\leq 1$, $0<y<1$), lithium iron phosphate (for example, $Li_xFePO_4$; $0<x\leq 1$), and a lithium-nickel-cobalt-manganese composite oxide ($Li_xNi_{1-y-z}Co_yMn_zO_2$; $0<x\leq 1$, $0<y<1$, $0<z<1$, $y+z<1$). Use of such a compound as the positive electrode active material can increase the positive electrode potential.

When an ambient-temperature molten salt is used as the electrolyte of the battery, it is preferred to use a positive electrode active material containing lithium iron phosphate, $Li_xVPO_4F$ ($0\leq x\leq 1$), a lithium-manganese composite oxide, a lithium-nickel composite oxide, a lithium-nickel-cobalt composite oxide, or a mixture thereof. Since these compounds have low reactivity with the ambient-temperature molten salt, the cycle lifetime can be improved. The details of the ambient-temperature molten salt will be described later.

The primary particle diameter of the positive electrode active material is preferably 100 nm or more and 1 μm or less. The positive electrode active material having a primary particle diameter of 100 nm or more is easy to handle in industrial production. The positive electrode active material having a primary particle diameter of 1 μm or less enables smooth progress of diffusion of lithium ions in a solid.

The specific surface area of the positive electrode active material is preferably 0.1 $m^2/g$ or more and 10 $m^2/g$ or less. The positive electrode active material having a specific surface area of 0.1 $m^2/g$ or more can sufficiently ensure Li ion occlusion/release sites. The positive electrode active material having a specific surface area of 10 $m^2/g$ or less is easy to handle in industrial production and can ensure good charge/discharge cycle performance.

The binder has a function of binding the positive electrode active material and the electrically conductive agent. As the binder, for example, at least one compound selected from the group consisting of polytetrafluoroethylene (PTFE), polyvinylidene fluoride (PVdF), a fluororubber, an ethylene-butadiene rubber, polypropylene (PP), polyethylene (PE), carboxymethyl cellulose (CMC), polyimide (PI), and polyacrylimide (PAI) can be used, but the binder is not limited thereto. For example, the polymeric material contained in the composite layer can be used as the binder. Use of the same material as the polymeric material used for the composite layer as the binder used for the positive electrode active material-containing layer can improve the bonding degree when both are joined to each other. As the binder, one type may be used or two or more types may be mixed and used.

In the positive electrode active material-containing layer, the positive electrode active material and the binder are preferably blended in a proportion of 80 mass % or more and 98 mass % or less and a proportion of 2 mass % or more and 20 mass % or less, respectively.

When the amount of the binder is set to 2 mass % or more, a sufficient electrode strength is obtained. Further, the binder may function as an insulator. Therefore, when the amount of the binder is set to 20 mass % or less, the amount of an insulator contained in the electrode is reduced, so that the internal resistance can be reduced.

When the electrically conductive agent is added, the positive electrode active material, the binder, and the electrically conductive agent are preferably blended in a proportion of 77 mass % or more and 95 mass % or less, a proportion of 2 mass % or more and 20 mass % or less, and a proportion of 3 mass % or more and 15 mass % or less, respectively.

When the amount of the electrically conductive agent is set to 3 mass % or more, the above-mentioned effects can be exhibited. Further, when the amount of the electrically conductive agent is set to 15 mass % or less, the proportion of the electrically conductive agent that comes in contact with the electrolyte can be reduced. When the proportion is low, decomposition of the electrolyte can be reduced under high-temperature storage.

The positive electrode current collector contains, for example, a metal such as stainless steel, aluminum (Al) or titanium (Ti), or an aluminum alloy containing one or more elements selected from Mg, Ti, Zn, Ni, Cr, Mn, Fe, Cu and Si. The positive electrode current collector has a form of, for example, a foil, a porous body, or a mesh. In order to prevent corrosion due to a reaction between the positive electrode current collector and the aqueous electrolyte, the surface of the positive electrode current collector may be coated with a different type of element. The positive electrode current collector is preferably a material having excellent corrosion resistance and oxidation resistance such as a Ti foil. When a $Li_2SO_4$ aqueous solution is used as the aqueous electrolyte, corrosion does not proceed, so that Al may be used as the positive electrode current collector.

In addition, the positive electrode current collector can include a portion where the positive electrode active material-containing layer is not formed on the surface thereof. This portion can serve as a positive electrode current collector tab. Alternatively, a positive electrode current collector tab separate from the positive electrode current collector may be electrically connected to the positive electrode.

(Separator)

The separator is located between the negative electrode and the positive electrode. The separator includes a composite layer. The separator may include a composite layer, or may include a composite layer and another separator. Therefore, the separator may be configured to stack a composite layer and another separator, or may be configured to sandwich a composite layer with another separator. The composite layer and another separator that may be provided in the separator will be described below.

(Composite Layer)

The composite layer is located between the negative electrode and the positive electrode. The composite layer may be provided, for example, on the negative electrode active material-containing layer. Alternatively, the composite layer may be provided, for example, on the positive electrode active material-containing layer. The composite layer may be provided on each of the negative electrode active material-containing layer and the positive electrode active material-containing layer. For example, in an electrode in which active material-containing layers are supported on both surfaces of a current collector, the composite layer may be provided on a main surface of one of the active material-containing layers, or may be provided on a main surface of each of the active material-containing layers.

The composite layer contains inorganic solid particles and a polymeric material. As the inorganic solid particles, a material exhibiting electrical insulation properties can be used. When a material exhibiting electrical insulation properties is used for the inorganic solid particles, the composite layer can also function as a separator that electrically insulates the negative electrode from the positive electrode.

The composite layer may be joined to at least one of the positive electrode and the negative electrode. The composite layers may be individually joined to each of the positive electrode and the negative electrode. Alternatively, a single composite layer may be joined to both of the positive electrode and the negative electrode. The peel strength at the interface between the composite layer and the electrode is preferably greater than 0.3 N/mm. That is, the peel strength $\sigma_n$, which indicates the joining degree between the negative electrode and the composite layer, is preferably greater than 0.3 N/mm. Similarly, the peel strength $\sigma_p$, which indicates the joining degree between the positive electrode and the composite layer, is preferably greater than 0.3 N/mm. When the composite layer is joined to both of the positive electrode and the negative electrode, both of the peel strength $\sigma_n$ and the peel strength $\sigma_p$ are preferably greater than 0.3 N/mm. The peel strength $\sigma_n$ and the peel strength $\sigma_p$ are measured by a surface/interface cutting method described later.

The composite layer has a porosity of 1% or more and less than 15%. In addition, the porosity of the composite layer is less than both of the porosity of the negative electrode active material-containing layer and the porosity of the positive electrode active material-containing layer. By providing such a dense composite layer between the positive electrode and the negative electrode, the amount of movement of water molecules and protons therebetween can be reduced. As a result, a side reaction such as continuous decomposition of water can be reduced, thereby improving the battery performance. Since such a secondary battery employs the aqueous electrolyte with good electrical conduction properties, even when the composite layer is made dense, an increase in electrical resistance does not matter. On the other hand, in a non-aqueous electrolyte battery, the electrical resistance may increase when a dense composite layer or separator is used because the electrical conduction properties of the non-aqueous solvent is not high. The porosity of the composite layer is preferably 2.5% or more.

The inorganic solid particles contained in the composite layer are electrically insulating. Examples of the inorganic solid particles include oxide-based ceramics such as alumina, silica, zirconia, yttria, magnesium oxide, calcium oxide, barium oxide, strontium oxide, and vanadium oxide, carbonates and sulfates such as sodium carbonate, potassium carbonate, magnesium carbonate, calcium carbonate, barium carbonate, lanthanum carbonate, cerium carbonate, calcium sulfate, magnesium sulfate, aluminum sulfate, gypsum, and barium sulfate, phosphates such as hydroxyapatite, lithium phosphate, zirconium phosphate, and titanium phosphate, nitride-based ceramics such as silicon nitride, titanium nitride, and boron nitride. The inorganic particles listed above may be in the form of a hydrate.

Examples of other inorganic solid particles include solid electrolyte particles having ion conduction properties for alkali metal ions. Inorganic solid particles having ion conduction properties for lithium ions and sodium ions are more preferred. The phrase "having lithium ion conduction properties" here means exhibiting a lithium ion conductivity of $1\times10^{-6}$ S/cm or more at 25° C. The lithium ion conductivity can be measured, for example, by an AC impedance method. Use of such inorganic solid particles can provide the composite layer having lithium ion conduction properties or sodium ion conduction properties.

Examples of the inorganic solid particles having lithium ion conduction properties include an oxide-based solid electrolyte and a sulfide-based solid electrolyte. As the oxide-based solid electrolyte, it is preferred to use a lithium phosphate solid electrolyte having a NASICON (Sodium (Na) Super Ionic Conductor) structure and represented by a general formula $Li_{1+x}M\alpha_2(PO_4)_3$. Mα in the above-mentioned general formula is, for example, one or more elements selected from the group consisting of titanium (Ti), germanium (Ge), strontium (Sr), zirconium (Zr), tin (Sn), aluminum (Al), and calcium (Ca). The subscript x is in the following range: $0\le x\le 2$.

Specific examples of the lithium phosphate solid electrolyte having a NASICON structure include an LATP compound represented by $Li_{1+x}Al_xTi_{2-x}(PO_4)_3$ where $0.1\le x\le 0.5$; a compound represented by $Li_{1+x}Al_yM\beta_{2-y}(PO_4)_3$ where Mβ is one or more elements selected from the group consisting of Ti, Ge, Sr, Zr, Sn, and Ca, and $0\le x\le 1$ and $0\le y\le 1$; a compound represented by $Li_{1+x}Al_xGe_{2-x}(PO_4)_3$ where $0\le x\le 2$; a compound represented by $Li_{1+x}Al_xZr_{2-x}(PO_4)_3$ where $0\le x\le 2$; a compound represented by $Li_{1+x+y}Al_xM\gamma_{2-x}Si_yP_{3-y}O_{12}$ where Mγ is one or more elements selected from the group consisting of Ti and Ge, and $0<x\le 2$ and $0\le y<3$; and a compound represented by $Li_{1+2x}Zr_{1-x}Ca_x(PO_4)_3$ where $0\le x<1$. $Li_{1+2x}Zr_{1-x}Ca_x(PO_4)_3$ has high water resistance, low reducibility, and low cost, and therefore is preferably used as the inorganic solid electrolyte particles.

Examples of the oxide-based solid electrolyte include, in addition to the above-mentioned lithium phosphate solid electrolyte, an amorphous LIPON compound represented by $Li_xPO_yN_z$ where $2.6\le x\le 3.5$, $1.9\le y\le 3.8$, and $0.1\le z\le 1.3$ (for example, $Li_{2.9}PO_{3.3}N_{0.46}$); a compound having a garnet-type structure and represented by $La_{5+x}A_xLa_{3-x}M\delta_2O_{12}$ where A is one or more elements selected from the group consisting of Ca, Sr, and Ba, Mδ is one or more elements selected from the group consisting of Nb and Ta, and $0\le x\le 0.5$; a compound represented by $Li_3M\delta_{2-x}L_2O_{12}$ where Mδ is one or more elements selected from the group consisting of Ta and Nb, and L may contain Zr, and $0\le x\le 0.5$; a compound represented by $Li_{7-3x}Al_xLa_3Zr_3O_{12}$ where $0 \leq x \leq 0.5$; an LLZ compound represented by $Li_{5+x}La_3M\delta_{2-x}Zr_xO_{12}$ where Mδ is one or more elements selected from the group consisting of Nb and Ta and $0 \leq x \leq 2$ (for example, $Li_7La_3Zr_2O_{12}$); and a compound having a perovskite-type structure and represented by $La_{2/3-x}Li_xTiO_3$ where $0.3 \leq x \leq 0.7$. As the solid electrolyte, one type may be used or two or more types may be mixed and used.

As the inorganic solid particles having sodium ion conduction properties, a sodium-containing solid electrolyte may be used. The sodium-containing solid electrolyte has excellent sodium ion conduction properties. Examples of the sodium-containing solid electrolyte include β-alumina, sodium sulfide phosphate, and sodium phosphorus oxide. The sodium ion-containing solid electrolyte is preferably in the form of a glass ceramic.

The shape of the inorganic solid particles is not particularly limited, and for example, a spherical shape, an elliptical shape, a flat shape, a fibrous shape, or the like can be adopted.

The particle size distribution of the inorganic solid particles in the composite layer is at least bimodal. In at least two peaks in the particle size distribution, a particle diameter corresponding to the position of a peak top $P_S$ of a peak on a smallest particle diameter side is defined as a first particle diameter. In at least two peaks, a particle diameter corresponding to the position of a peak top $P_L$ of a peak on a largest particle diameter side is defined as a second particle diameter. In the particle size distribution, a frequency $FP_S$ of the first particle diameter and a frequency $FP_L$ of the second particle diameter based on the volume have a relationship of $0.9 \leq FP_S/FP_L \leq 5$. It is preferred that the first particle diameter is in a range of 0.3 μm or more and 0.8 μm or less, and the second particle diameter is in a range of 1 μm or more and 4 μm or less. For example, the composite layer may contain a mixture of at least first particles having a small particle diameter with a mode diameter of 0.3 μm or more and 0.8 μm or less and second particles having a large particle diameter with a mode diameter of 1 μm or more and 4 μm or less as the inorganic solid particles. The particle size distribution of the inorganic solid particles in the composite layer can be measured by a laser diffraction method described later.

In the composite layer, as the inorganic solid particles, a single type may be used or two or more types may be mixed and used.

The polymeric material contained in the composite layer enhances the bondability between the inorganic solid particles. The weight average molecular weight of the polymeric material is, for example, 3,000 or more. When the weight average molecular weight of the polymeric material is 3,000 or more, the bondability of the inorganic solid particles can be further enhanced. The weight average molecular weight of the polymeric material is preferably 3,000 or more and 5,000,000 or less, more preferably 5,000 or more and 2,000,000 or less, and even more preferably 10,000 or more and 1,000,000 or less. The weight average molecular weight of the polymeric material can be determined by gel permeation chromatography (GPC).

The polymeric material may be a polymer including a single monomer unit, a copolymer including a plurality of monomer units, or a mixture thereof. The polymeric material preferably contains a monomer unit that includes a hydrocarbon having a functional group containing one or more elements selected from the group consisting of oxygen (O), sulfur (S), nitrogen (N), and fluorine (F). In the polymeric material, the proportion of a portion that includes the monomer unit is preferably 70 mol % or more. Hereinafter, this monomer unit is referred to as "first monomer unit". In addition, in a copolymer, a monomer unit other than the first monomer unit is referred to as "second monomer unit". The copolymer of the first monomer unit and the second monomer unit may be an alternating copolymer, a random copolymer, or a block copolymer.

In the polymeric material, when the proportion of a portion that includes the first monomer unit is less than 70 mol %, the water impermeability of the composite layer may deteriorate. In the polymeric material, the proportion of the portion that includes the first monomer unit is preferably 90 mol % or more. The polymeric material is most preferably such that the proportion of the portion that includes the first monomer unit is 100 mol %, that is, the polymeric material is a polymer including only the first monomer unit.

The first monomer unit may be a compound, which has a functional group containing one or more elements selected from the group consisting of oxygen (O), sulfur (S), nitrogen (N), and fluorine (F) in a side chain, and in which a main chain includes a carbon-carbon bond. The hydrocarbon may have one or more functional groups containing one or more elements selected from the group consisting of oxygen (O), sulfur (S), nitrogen (N), and fluorine (F). The functional group in the first monomer unit enhances the conduction properties of alkali metal ions passing through the composite layer.

Examples of the first monomer unit include one or more compounds selected from the group consisting of vinyl formal, vinyl alcohol, vinyl acetate, vinyl acetal, vinyl butyral, acrylic acid and a derivative thereof, methacrylic acid and a derivative thereof, acrylonitrile, acrylamide and a derivative thereof, styrenesulfonic acid, polyvinylidene fluoride, and tetrafluoroethylene.

The polymeric material preferably contains one or more compounds selected from the group consisting of polyvinyl formal, polyvinyl alcohol (PVA), polyvinyl acetal, polyvinyl butyral (PVB), polymethyl methacrylate, polyvinylidene fluoride (PVdF), polytetrafluoroethylene (PTFE), a fluororubber, a styrene-butadiene rubber, a polyacrylic acid compound, an imide compound, and carboxymethyl cellulose (CMC).

The second monomer unit is a compound other than the first monomer unit, that is, a compound that does not have a functional group containing one or more elements selected from the group consisting of oxygen (O), sulfur (S), nitrogen (N), and fluorine (F) or is not a hydrocarbon even if this functional group is contained. Examples of the second monomer unit include ethylene oxide and styrene. Examples of a polymer that includes the second monomer unit include polyethylene oxide (PEO) and polystyrene (PS).

The types of functional groups contained in the first monomer unit and the second monomer unit can be identified by infrared spectroscopy (Fourier Transform Infrared Spectroscopy; FT-IR). Further, it can be determined by nuclear magnetic resonance (NMR) that the first monomer unit includes a hydrocarbon. In addition, in a copolymer of the first monomer unit and the second monomer unit, the proportion of the portion that includes the first monomer unit can be calculated by NMR.

The content of the polymeric material in the composite layer is preferably 10 vol % or more, and more preferably 20 vol % or more. From the viewpoint of enhancing the flexibility of the composite layer, the content of the polymeric material is preferably larger. In addition, the higher the content of the polymeric material is, the more likely the denseness of the composite layer is to increase. From the viewpoint of enhancing the ion conduction properties of the composite layer, the content of the polymeric material is preferably 50 vol % or less, more preferably 45 vol % or less, and even more preferably 40 vol % or less. The content of the polymeric material in the composite layer can be calculated by a thermogravimetric (TG) analysis.

As the polymeric material contained in the composite layer, a single type may be used or a plurality of types may be mixed and used.

The composite layer may contain a plasticizer or an electrolyte salt in addition to the inorganic solid particles and the polymeric material. For example, when the composite layer contains an electrolyte salt, the alkali metal ion conduction properties of the composite layer can be further enhanced.

The thickness of the composite layer is preferably 5 μm or more, more preferably 7 μm or more, and even more preferably 10 μm or more from the viewpoint that an internal short circuit is less likely to occur. Further, the thickness of the composite layer is preferably 50 μm or less, more preferably 30 μm or less, and even more preferably 20 μm or less from the viewpoint of increasing the ion conduction properties and energy density. When a plurality of composite layers are included, the thicknesses thereof may be the same or different.

(Another Separator)

As the other separator, for example, a non-woven fabric or a self-supporting porous film can be used. As a material of the non-woven fabric or the self-supporting porous film, for example, polyethylene (PE), polypropylene (PP), cellulose, or polyvinylidene fluoride (PVdF) is used. The other separator is preferably a cellulose non-woven fabric.

The thickness of the other separator is, for example, 1 μm or more, and preferably 3 μm or more. The thicker the other separator is, the less likely an internal short circuit is to occur in the secondary battery. The thickness of the other separator is, for example, 30 μm or less, and preferably 10 μm or less. The thinner the other separator is, the lower the internal resistance of the secondary battery is, and the higher the volume energy density of the secondary battery tends to be.

(Aqueous Electrolyte)

The aqueous electrolyte contains an aqueous solvent and an electrolyte salt. The aqueous electrolyte is, for example, liquid. The liquid aqueous electrolyte is an aqueous solution prepared by dissolving the electrolyte salt as a solute in the aqueous solvent. In the aqueous solution, the amount of the aqueous solvent is preferably 1 mol or more, and more preferably 3.5 mol or more with respect to 1 mol of the salt serving as the solute.

As the aqueous solvent, a solution containing water can be used. Here, the solution containing water may be pure water or a mixed solvent of water and an organic solvent. The proportion of water contained in the aqueous solvent is, for example, 50 vol % or more, and preferably 90 vol % or more.

The aqueous electrolyte may be a gel electrolyte. The gel electrolyte may be prepared by mixing the above-mentioned liquid aqueous electrolyte and a polymer compound to form a composite. Examples of the polymer compound include polyvinylidene fluoride (PVdF), polyacrylonitrile (PAN), and polyethylene oxide (PEO).

The presence of water in the aqueous electrolyte can be investigated by gas chromatography-mass spectrometry (GC-MS) measurement. In addition, the salt concentration and water content in the aqueous electrolyte can be measured, for example, by inductively coupled plasma (ICP) emission spectrometry. The molar concentration (mol/L) can be calculated by weighing out a specified amount of the aqueous electrolyte and calculating the concentration of the salt contained therein. Further, the number of moles of the solute and the solvent can be calculated by measuring the specific gravity of the aqueous electrolyte.

As the electrolyte salt, for example, a lithium salt, a sodium salt, or a mixture thereof may be used. As the electrolyte salt, one type or two or more types can be used.

As the lithium salt, for example, lithium chloride (LiCl), lithium bromide (LiBr), lithium hydroxide (LiOH), lithium sulfate ($Li_2SO_4$), lithium nitrate ($LiNO_3$), lithium acetate ($CH_3COOLi$), lithium oxalate ($Li_2C_2O_4$), lithium carbonate ($Li_2CO_3$), lithium bis(trifluoromethanesulfonyl)imide (LiTFSI; $LiN(SO_2CF_3)_2$), lithium bis(fluorosulfonyl)imide (LiFSI; $LiN(SO_2F)_2$), lithium bisoxalate borate (LiBOB; $LiB[(OCO)_2]_2$), or the like can be used.

As the sodium salt, sodium chloride (NaCl), sodium sulfate ($Na_2SO_4$), sodium hydroxide (NaOH), sodium nitrate ($NaNO_3$), sodium trifluoromethanesulfonylamide (NaTFSA), or the like can be used.

The lithium salt preferably contains LiCl. Use of LiCl can increase the lithium ion concentration of the aqueous electrolyte. Further, the lithium salt preferably contains at least one of $LiSO_4$ and LiOH in addition to LiCl.

Further, in addition to the lithium salt, a zinc salt such as zinc chloride or zinc sulfate may be added to the electrolytic solution. By adding such a compound to the electrolytic solution, a zinc-containing coating layer and/or an oxidized zinc-containing region may be formed on the negative electrode. These zinc-containing members exhibit an effect of reducing hydrogen generation at the electrode on which the members are formed.

The molar concentration of lithium ions or sodium ions in the aqueous electrolyte is preferably 3 mol/L or more, preferably 6 mol/L or more, and more preferably 12 mol/L or more. When the concentration of lithium ions or sodium ions in the aqueous electrolyte is high, electrolysis of the aqueous solvent at the electrode tends to be reduced, and hydrogen generation from the electrode tends to be low.

The pH of the aqueous electrolyte is preferably 3 or more and 14 or less, and more preferably 4 or more and 13 or less. The pH is a value measured at 25±2° C.

(Exterior Member)

As the exterior member that houses the electrode group and the aqueous electrolyte, a metal container, a laminate film container, or a resin container can be used.

As the metal container, a metal can made of nickel, iron, stainless steel, or the like and having a prismatic shape or a cylindrical shape can be used. As the resin container, a container made of polyethylene, polypropylene, or the like can be used.

The plate thickness of each of the resin container and the metal container is preferably in a range of 0.05 mm or more and 1 mm or less. The plate thickness is more preferably 0.5 mm or less, and even more preferably 0.3 mm or less.

Examples of the laminate film include a multilayer film in which a metal layer is coated with a resin layer. Examples of the metal layer include a stainless steel foil, an aluminum foil, and an aluminum alloy foil. A polymer such as polypropylene (PP), polyethylene (PE), nylon, or polyethylene terephthalate (PET) can be used for the resin layer. The thickness of the laminate film is preferably in a range of 0.01 mm or more and 0.5 mm or less. The thickness of the laminate film is more preferably 0.2 mm or less.

(Negative Electrode Terminal)

The negative electrode terminal can be made of, for example, a material that is electrochemically stable in a potential range of 1 V or more and 3 V or less (vs. $Li/Li^+$)

with respect to the lithium redox potential and is electrically conductive. Specific examples of the material of the negative electrode terminal include zinc, copper, nickel, stainless steel, or aluminum, or an aluminum alloy containing at least one element selected from the group consisting of Mg, Ti, Zn, Mn, Fe, Cu, and Si. As the material of the negative electrode terminal, it is preferred to use zinc or a zinc alloy. The negative electrode terminal is preferably made of the same material as the negative electrode current collector in order to reduce the contact resistance with the negative electrode current collector.

(Positive Electrode Terminal)

The positive electrode terminal can be made of, for example, a material that is electrochemically stable in a potential range of 2.5 V or more and 4.5 V or less (vs. $Li/Li^+$) with respect to the lithium redox potential and is electrically conductive. Specific examples of the material of the positive electrode terminal include titanium, aluminum, or an aluminum alloy containing at least one element selected from the group consisting of Mg, Ti, Zn, Mn, Fe, Cu and Si. The positive electrode terminal is preferably made of the same material as the positive electrode current collector in order to reduce the contact resistance with the positive electrode current collector.

Such a secondary battery may be used in various shapes such as a prismatic shape, a cylindrical shape, a flat shape, a thin shape, or a coin shape. Further, the secondary battery may be a secondary battery having a bipolar structure. The secondary battery having a bipolar structure has an advantage that a plurality of cells in series can be made of a single cell.

Figure 4:
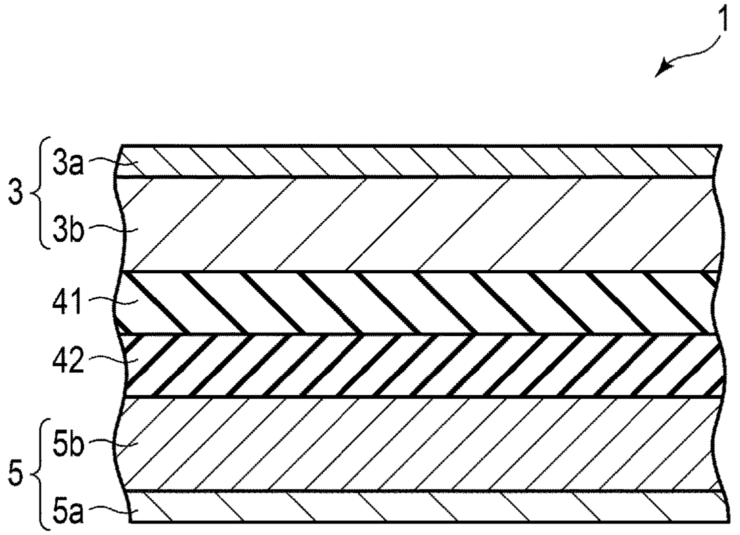
FIG. 4 is a sectional view schematically showing an example of an electrode group that may be provided in a secondary battery according to the embodiment.

FIG. 4 shows an example of the above-mentioned electrode group. FIG. 4 is a sectional view schematically showing an example of the electrode group that can be provided in a secondary battery according to the embodiment.

An electrode group 1 includes a negative electrode 3, a composite layer 41, another composite layer 42, and a positive electrode 5. The negative electrode 3 includes a negative electrode current collector 3*a* and a negative electrode active material-containing layer 3*b*. The positive electrode 5 includes a positive electrode current collector 5*a* and a positive electrode active material-containing layer 5*b*. The composite layers 41 and 42 are disposed between the negative electrode 3 and the positive electrode 5. The composite layer 41 is desirably at least in contact with the main surface of the negative electrode active material-containing layer 3*b* at a position opposite to the negative electrode current collector 3*a* as shown in the drawing. More preferably, the composite layer 41 is joined to the negative electrode active material-containing layer 3*b*. The composite layer 42 is desirably at least in contact with the main surface of the positive electrode active material-containing layer 5*b* at a position opposite to the positive electrode current collector 5*a* as shown in the drawing. More preferably, the composite layer 42 is joined to the positive electrode active material-containing layer 5*b*. One of the composite layer 41 and the composite layer 42 may be omitted.

Figure 5:
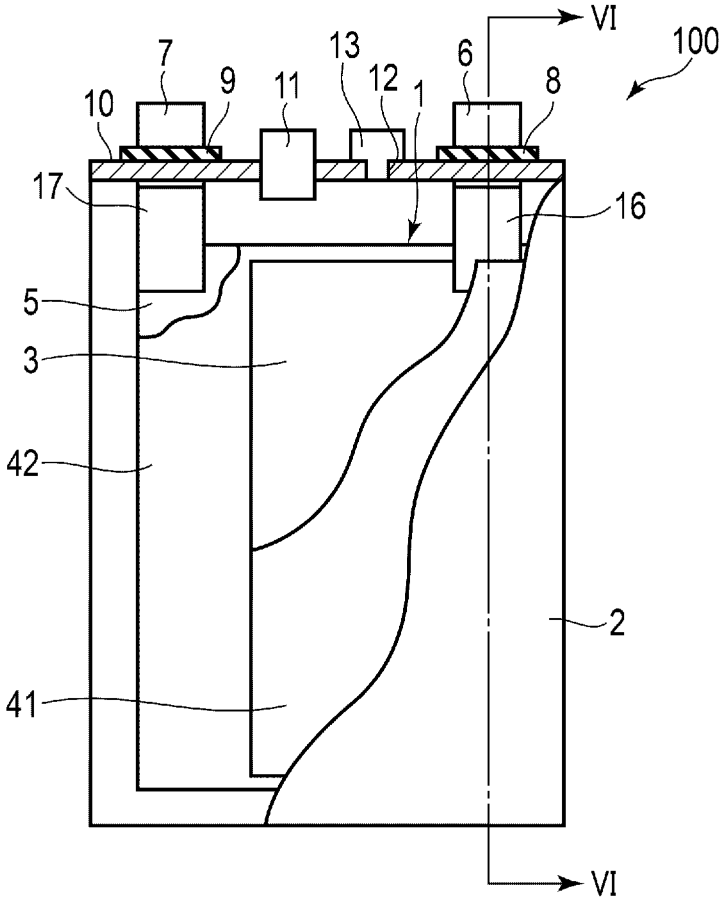
FIG. 5 is a sectional view schematically showing an example of a secondary battery according to the embodiment.
Figure 6:
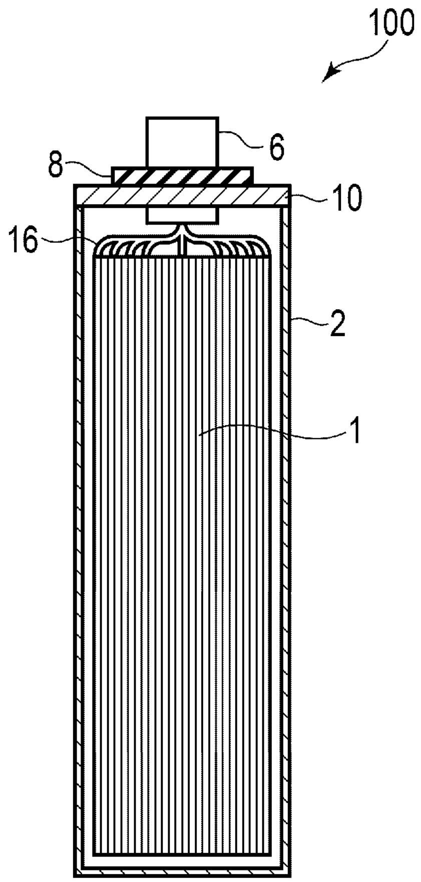
FIG. 6 is a sectional view of the secondary battery shown in FIG. 5 taken along line VI-VI.

Hereinafter, examples of secondary batteries according to the embodiment will be described with reference to the drawings. FIG. 5 is a sectional view schematically showing an example of the secondary battery according to the embodiment. FIG. 6 is a sectional view of the secondary battery shown in FIG. 5 taken along line VI-VI.

The electrode group 1 is housed in an exterior member 2 including a rectangular tubular metal container. The electrode group 1 includes the negative electrode 3, the positive electrode 5, the composite layer 41, and the composite layer 42. The composite layer 41 and the composite layer 42 function as the separators, and are provided, for example, on the main surfaces of the negative electrode 3 and the positive electrode 5, respectively. The electrode group 1 has a structure in which the positive electrode 5 and the negative electrode 3 are spirally wound into a flat shape with the composite layers 41 and 42 as the separators interposed therebetween. An aqueous electrolyte (not shown) is held in the electrode group 1. As shown in FIG. 5, a strip-shaped negative electrode lead 16 is electrically connected to each of a plurality of locations on the end of the negative electrode 3 located on the end surface of the electrode group 1. In addition, a strip-shaped positive electrode lead 17 is electrically connected to each of a plurality of locations on the end of the positive electrode 5 located on this end surface. The plurality of negative electrode leads 16 are connected to the negative electrode terminal 6 while being bundled into one as shown in FIG. 6. Further, although not shown in the drawing, the positive electrode leads 17 are also similarly electrically connected to the positive electrode terminal 7 while being bundled into one.

A sealing plate 10 made of a metal is fixed to the opening of the exterior member 2 made of a metal by welding or the like. Each of the negative electrode terminal 6 and the positive electrode terminal 7 is drawn to the outside from an extraction hole provided in the sealing plate 10. In order to avoid a short circuit due to contact with the negative electrode terminal 6 and the positive electrode terminal 7, each of a negative electrode gasket 8 and a positive electrode gasket 9 is placed on the inner peripheral surface of the corresponding extraction hole in the sealing plate 10. By disposing the negative electrode gasket 8 and the positive electrode gasket 9, the airtightness of the secondary battery 100 can be maintained.

A control valve 11 (safety valve) is placed in the sealing plate 10. When an internal pressure in the battery cell increases due to a gas generated by electrolysis of the aqueous solvent, the generated gas can be released to the outside through the control valve 11. As the control valve 11, for example, a return-type valve that operates when the internal pressure exceeds a set value and functions as a sealing plug when the internal pressure drops can be used. Alternatively, a non-return-type control valve that does not recover the function as a sealing plug when it once operates may be used. Although the control valve 11 is disposed in the center of the sealing plate 10 in FIG. 5, the position of the control valve 11 may be an end portion of the sealing plate 10. The control valve 11 may be omitted.

In addition, the sealing plate 10 is provided with a liquid injection port 12. The aqueous electrolyte can be injected through the injection port 12. The injection port 12 may be closed with a sealing plug 13 after the aqueous electrolyte is injected. The injection port 12 and the sealing plug 13 may be omitted.

Figure 7:
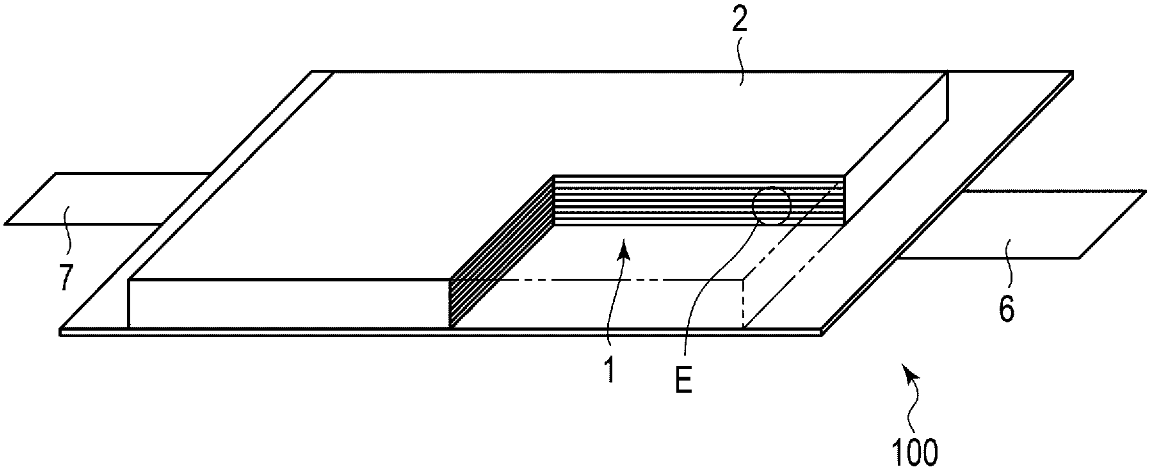
FIG. 7 is a partially cutaway perspective view schematically showing another example of a secondary battery according to the embodiment.
Figure 8:
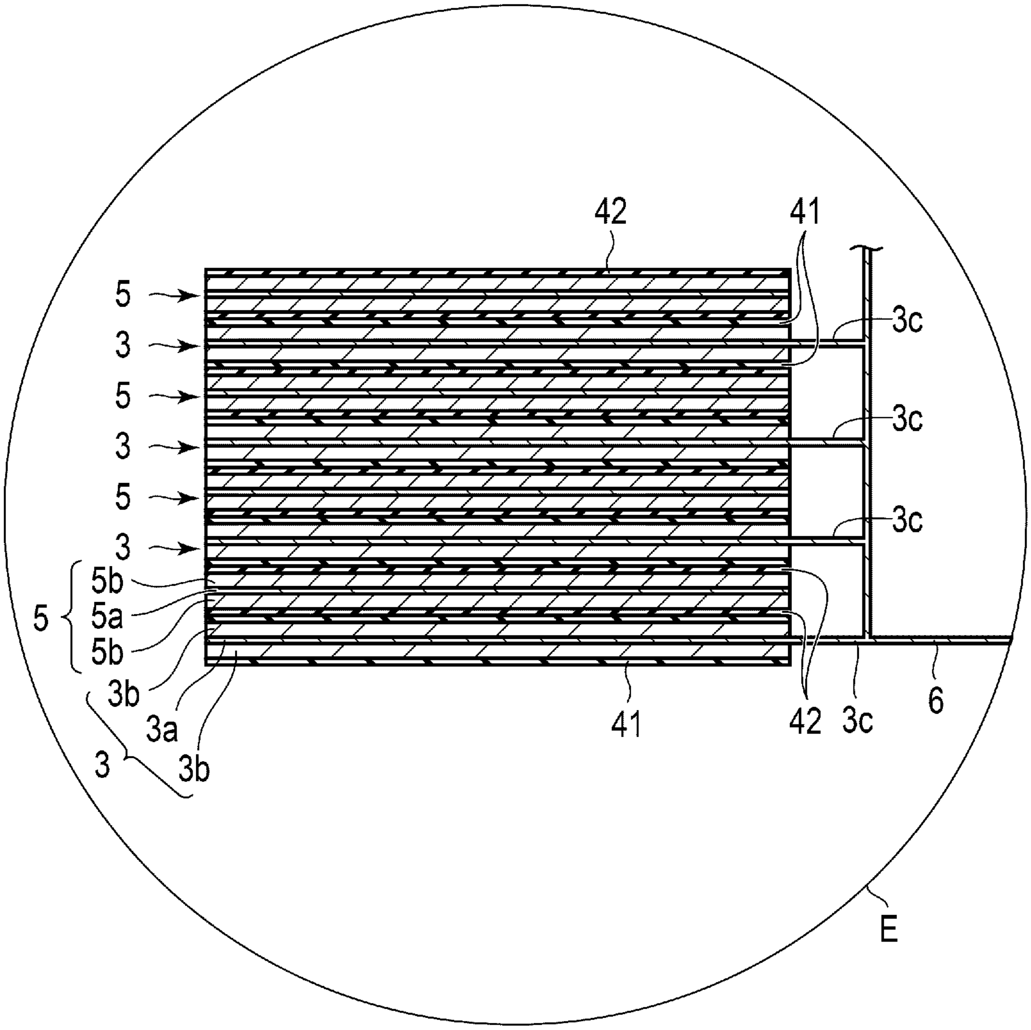
FIG. 8 is an enlarged sectional view of a portion E of the secondary battery shown in FIG. 7.

FIG. 7 is a partially cutaway perspective view schematically showing another example of a secondary battery according to the embodiment. FIG. 8 is an enlarged sectional view of a portion E of the secondary battery shown in FIG. 7. FIGS. 7 and 8 show an example of the secondary battery 100 using a laminate film exterior member as the exterior member.

The secondary battery 100 shown in FIGS. 7 and 8 includes the electrode group 1 shown in FIGS. 7 and 8, the exterior member 2 shown in FIG. 7, and the aqueous electrolyte (not shown). The electrode group 1 and the aqueous electrolyte are housed in the exterior member 2. The aqueous electrolyte is held in the electrode group 1.

The exterior member 2 is made of a laminate film including two resin layers and a metal layer interposed therebetween.

The electrode group 1 is a stacked electrode group as shown in FIG. 8. The stacked electrode group 1 has a structure in which the negative electrode 3 and the positive electrode 5 are alternately stacked with the composite layers 41 and 42 interposed therebetween.

The electrode group 1 includes a plurality of negative electrodes 3. Each of the plurality of negative electrodes 3 includes the negative electrode current collector 3*a* and the negative electrode active material-containing layers 3*b* supported on both surfaces of the negative electrode current collector 3*a*. The composite layer 41 is in contact with the negative electrode active material-containing layer 3*b* on each surface. Further, the electrode group 1 includes a plurality of positive electrodes 5. Each of the plurality of positive electrodes 5 includes the positive electrode current collector 5*a* and the positive electrode active material-containing layers 5*b* supported on both surfaces of the positive electrode current collector 5*a*. The composite layer 42 is in contact with the positive electrode active material-containing layer 5*b* on each surface.

The negative electrode current collector 3*a* of each negative electrode 3 includes a portion on one side where the negative electrode active material-containing layer 3*b* is not provided on any surface. This portion serves as a negative electrode current collector tab 3*c*. As shown in FIG. 8, the negative electrode current collector tab 3*c* does not overlap with the positive electrode 5. Further, the plurality of negative electrode current collector tabs 3*c* are electrically connected to the strip-shaped negative electrode terminal 6. The tip of the strip-shaped negative electrode terminal 6 is drawn to the outside of the exterior member 2.

In addition, although not shown in the drawing, the positive electrode current collector 5*a* of each positive electrode 5 includes a portion on one side where the positive electrode active material-containing layer 5*b* is not supported on any surface. This portion serves as a positive electrode current collector tab. The positive electrode current collector tab does not overlap with the negative electrode 3 in the same manner as the negative electrode current collector tab 3*c*. Further, the positive electrode current collector tab is located on the opposite side of the electrode group 1 with respect to the negative electrode current collector tab 3*c*. The positive electrode current collector tab is electrically connected to the strip-shaped positive electrode terminal 7. The tip of the strip-shaped positive electrode terminal 7 is located on the opposite side of the negative electrode terminal 6 and is drawn to the outside of the exterior member 2.

In the secondary battery 100 illustrated in each of the above-mentioned drawings, the composite layers 41 and 42 are interposed as the separators between the negative electrode 3 and the positive electrode 5. Either one of the composite layer 41 and the composite layer 42 may be omitted.

<Production Method>

Next, an example of a method for producing the electrode group provided in a secondary battery according to an embodiment will be described.

The negative electrode can be obtained, for example, by the following method. First, a slurry is prepared by suspending a negative electrode active material, an electrically conductive agent, and a binder in an appropriate solvent. This slurry is applied to one surface or both surfaces of a negative electrode current collector. The coating film on the negative electrode current collector is dried, thereby forming a negative electrode active material-containing layer. Thereafter, the negative electrode current collector and the negative electrode active material-containing layer formed thereon are pressed. When the composite layer is formed on the negative electrode, for the purpose of controlling the density of each of the negative electrode active material-containing layer and the composite layer to a desired value, pressing may be performed after forming the composite layer, or pressing may be performed both before and after forming the composite layer.

The positive electrode can be obtained, for example, by the following method. First, a slurry is prepared by suspending a positive electrode active material, an electrically conductive agent, and a binder in an appropriate solvent. This slurry is applied to one surface or both surfaces of a positive electrode current collector. The coating film on the positive electrode current collector is dried, thereby forming a positive electrode active material-containing layer. Thereafter, the positive electrode current collector and the positive electrode active material-containing layer formed thereon are pressed. When the composite layer is formed on the positive electrode, for the purpose of controlling the density of each of the positive electrode active material-containing layer and the composite layer to a desired value, pressing may be performed after forming the composite layer, or pressing may be performed both before and after forming the composite layer.

The composite layer can be formed on the positive electrode and/or the negative electrode, for example, as follows.

A slurry for forming the composite layer is prepared. The slurry for forming the composite layer is obtained by stirring a mixture obtained by mixing inorganic solid particles, a polymeric material, and a solvent.

As the solvent, it is preferred to use a solvent that can dissolve the polymeric material. As the solvent, for example, an alcohol such as ethanol, methanol, isopropyl alcohol, normal propyl alcohol, or benzyl alcohol; a ketone such as acetone, methyl ethyl ketone, methyl isobutyl ketone, cyclohexanone, or diacetone alcohol; an ester such as ethyl acetate, methyl acetate, butyl acetate, ethyl lactate, methyl lactate, or butyl lactate; an ether such as methyl cellosolve, ethyl cellosolve, butyl cellosolve, 1,4-dioxane, or tetrahydrofuran; a glycol such as ethylene glycol monoethyl ether acetate, propylene glycol monomethyl ether acetate, butyl carbitol acetate, or ethyl carbitol acetate; a glycol ether such as methyl carbitol, ethyl carbitol, or butyl carbitol; an aprotic polar solvent such as dimethylformamide, dimethylacetamide, acetonitrile, valeronitrile, N-methyl-2-pyrrolidone, N-ethyl-2-pyrrolidone, or γ-butyrolactam; a cyclic carboxylic acid ester such as gamma-butyrolactone, gamma-valerolactone, gamma-caprolactone, or epsilon-caprolactone; a chain carbonate compound such as dimethyl carbonate, diethyl carbonate, di-n-propyl carbonate, diisopropyl carbonate, n-propyl isopropyl carbonate, ethylmethyl carbonate, or methyl-n-propyl carbonate is used.

The slurry for forming the composite layer is applied, for example, onto the active material-containing layer on one main surface of the negative electrode or the positive electrode by, for example, a doctor blade method, thereby obtaining a coating film. Alternatively, the slurry for forming the composite layer may be applied onto the active material-containing layer on both front and back main surfaces of the negative electrode or the positive electrode, thereby obtaining a coating film on each main surface. The slurries for forming the composite layer to be applied to the respective main surfaces may have the same composition or may have different compositions. Further, the slurry to be applied to the negative electrode and the slurry to be applied to the positive electrode may have the same composition or may have different compositions. This coating film is dried at a temperature of 50° C. or higher and 150° C. or lower. Thus, a stacked material in which the dried coating film is provided on the active material-containing layer on one surface or both surfaces of the electrode is obtained.

Subsequently, this stacked material is subjected to a roll press process. In the roll press process, for example, a press apparatus including two upper and lower rollers is used. With the use of such a press apparatus, when coating films are provided on both surfaces of the electrode, both coating films can be simultaneously pressed. At this time, the heating temperature of the roller can be appropriately changed according to a desired structure. For example, the heating temperature of the roller is set to a temperature within ±20° C. of the softening point of the polymeric material in the coating film. Alternatively, the coating film can be subjected to the roll press process at room temperature of 25° C. The heating temperature of the roller is preferably lower than the melting point of the polymeric material. When the heating temperature is raised above the melting point of the polymeric material, the polymeric material melts on the surface side of the coating film, and the pores may be completely lost. Complete loss of pores deteriorates the ion conduction properties of the composite layer, and therefore is not desirable.

The softening point and the melting point of the polymeric material may vary depending on the molecular weight and the monomer unit ratio. In one example, PVdF has a softening point of 135° C. or higher and 145° C. or lower and a melting point of 170° C. or higher and 180° C. or lower. Polyvinyl formal has a softening point of 120° C. or higher and 130° C. or lower and a melting point of 190° C. or higher and 200° C. or lower. Polyvinyl butyral has a softening point of 120° C. or higher and 130° C. or lower and a melting point of 190° C. or higher and 200° C. or lower.

Alternatively, a composite layer having a stacked structure may be provided by applying two types of slurries so as to form a two-layer structure.

In addition, as described above, for each electrode, for the purpose of controlling the density of each of the active material-containing layer and the composite layer, prior to application of the slurry for forming the composite layer, pressing is performed, and after drying the slurry coating film, pressing may be performed again.

As described above, the negative electrode that supports the composite layer and/or the positive electrode that supports the composite layer can be obtained. Note that when the above-mentioned press apparatus is used, the coating films provided on both surfaces of the electrode can be simultaneously subjected to the roll press process, but the roll press process may be performed for one surface at a time. Even when the coating film is provided only on one surface of the electrode, the above-mentioned press apparatus including two upper and lower rollers can be used.

Here, the peel strength $\sigma_n$ at the joining surface between the composite layer and the negative electrode and the peel strength $\sigma_p$ at the joining surface between the composite layer and the positive electrode can vary depending on the pressing pressure after drying the coating film of the slurry for forming the composite layer. For example, a decrease in the pressing pressure may result in a decrease in the peel strengths $\sigma_n$ and $\sigma_p$. Further, the peel strengths $\sigma_n$ and $\sigma_p$ may also vary depending on the composition of the slurry for forming the composite layer. For example, an increase in the proportion of the polymeric material may result in an increase in the peel strengths $\sigma_n$ and $\sigma_p$.

The porosity of the resulting composite layer may also vary depending on the slurry composition. For example, an increase in the proportion of the polymeric material may result in an increase in the porosity.

In addition, the thickness of the composite layer may vary depending on the application speed of the slurry for forming the composite layer. For example, a decrease in the application speed may result in an increase in the thickness of the composite layer.

The negative electrode and the positive electrode, at least one of which supports the composite layer, are stacked such that the main surfaces of the negative electrode active material-containing layer and the positive electrode active material-containing layer face each other with the composite layer interposed therebetween. In addition to the composite layer, another separator such as a nonwoven fabric may be interposed between the negative electrode and the positive electrode. For example, when a stacked electrode group is produced, a plurality of negative electrodes and positive electrodes may be alternately stacked such that at least the composite layer is interposed therebetween as the separator. Alternatively, when a wound electrode group is produced, one or more negative electrodes and one or more positive electrodes may be stacked with the separator (at least the composite layer) interposed therebetween, and then, the resulting stacked material may be spirally wound. After stacking, or after stacking and further winding, pressing is performed for the resulting structure. The electrode group can be produced in this manner.

By the above-mentioned procedure, an electrode group according to the embodiment can be obtained. The secondary battery according to the embodiment can be assembled using the obtained electrode group and the separately prepared aqueous electrolyte.

<Measurement Method>

Various measurement methods will be described. Specifically, methods for measuring the particle size distribution by a laser diffraction method, the peel strength between the electrode and the composite layer, the porosity of the composite layer and the active material-containing layer, and the pH of the aqueous electrolyte will be described.

(Measurement Method for Particle Size Distribution)

The particle size distribution of the inorganic solid particles contained in the composite layer and the particle size distribution of the active material contained in the electrode can be determined by a laser diffraction particle size distribution analyzer. As the laser diffraction particle size distribution analyzer, for example, Shimadzu SALD-300 may be used. In the measurement, the luminous intensity distribution is measured 64 times at intervals of 2 seconds. As a sample when measuring the particle size distribution of the inorganic solid particles in the composite layer, a dispersion obtained by dilution with ethanol so that the concentration of the inorganic solid particles is 0.01 mass % to 5 mass % is used. As a sample when measuring the particle size distribution of the electrode active material, a dispersion obtained by dilution with N-methyl-2-pyrrolidone so that the concentration of the active material particles is 0.1 mass % to 1 mass % is used. Alternatively, a dispersion in which 0.1 g of the active material is dispersed in 1 mL to 2 mL of distilled water containing a surfactant is used as a measurement sample.

(Measurement Method for Peel Strength)

The peel strength $\sigma_n$ at the interface between the negative electrode and the composite layer and the peel strength $\sigma_p$ at the interface between the positive electrode and the composite layer can be measured by a surface/interface cutting method. The details are as follows.

The secondary battery is discharged, and thereafter, the battery is disassembled and the electrode group is taken out. Before measurement, the outer surface of the electrode group is rinsed with pure water, and then, the electrode group is immersed in pure water and left for 48 hours or more. Thereafter, the electrode group is further rinsed with pure water and dried in a vacuum drying furnace at 100° C. for 48 hours or more, thereby preparing a measurement sample of the electrode group.

The measurement of the peel strength by the surface/interface cutting method can be performed using a cutting strength measurement apparatus such as Surface And Interfacial Cutting Analysis System (SAICAS) (registered trademark). The surface/interface cutting method is sometimes called the SAICAS method. As the measurement apparatus, for example, DN-GS manufactured by Daipla Wintes Co., Ltd. can be used. For a cutting blade, for example, a ceramic blade made of a borazon material having a blade width of 1.0 mm may be used. As the measurement conditions, for example, a blade angle is set as follows: a rake angle of 20° and a relief angle of 10°.

First, cutting is performed in the vertical direction with a pressing load of 1 N for one member forming the interface where the peel strength is measured in the sample (constant load mode). Here, when the peel strength $\sigma_n$ between the composite layer and the negative electrode is measured, for example, the member to be cut may be either one of the composite layer and the negative electrode active material-containing layer. When the peel strength $\sigma_p$ between the composite layer and the positive electrode is measured, for example, the member to be cut may be either one of the composite layer and the positive electrode active material-containing layer.

Cutting is performed at a shear angle of 45° at a constant horizontal speed of 2 μm/sec and a constant vertical speed of 0.2 μm/sec. When the blade reaches the interface to be measured, the member being cut is peeled at the interface, so that the load in the horizontal direction (horizontal force) applied to the blade decreases, and therefore, the position of the blade in the vertical direction is kept constant by controlling the load in the vertical direction to be 0.5 N at that stage. Thereafter, the horizontal force (the load in the horizontal direction) is measured at a horizontal speed of 2 μm/sec. After the horizontal force due to peeling becomes constant, the measurement is continued over a 0.5 mm-long region, and the average strength of the horizontal force measured in this length region is taken as the peel strength at the interface.

The peel strength between respective members in the electrode group is measured by the above-mentioned method, and each of the peel strength $\sigma_n$ between the composite layer and the negative electrode and the peel strength $\sigma_p$ between the composite layer and the positive electrode is determined.

Due to the characteristics of the surface/interface cutting method, a numerical value exceeding zero may be observed even at an interface where there is no joining or bonding between surfaces. Even in the case where the measured value is not zero, when the value of the peel strength is 0.1 N/mm or less, it is determined that the surfaces forming the interface are not joined or bonded to each other.

(Measurement Method for Porosity of Composite Layer and Active Material-Containing Layer)

The porosity of the composite layer can be measured through sectional observation with a scanning electron microscope (SEM). The porosity of each of the active material-containing layers of the negative electrode and the positive electrode can also be measured by similar SEM observation. The details are as follows.

The secondary battery is discharged, and thereafter, the battery is disassembled and the electrode group is taken out. Before measurement, each surface of the electrode group is rinsed with pure water, and then, the electrode group is immersed in pure water and left for 48 hours or more. Thereafter, each surface is further rinsed with pure water and dried in a vacuum drying furnace at 100° C. for 48 hours or more. Subsequently, cross-section polishing is performed by ion milling, thereby obtaining a cross-section of the composite layer to be measured. SEM observation is performed on the surface subjected to cross-section polishing at a magnification of 5,000 times, thereby obtaining an SEM image displayed with 1280×960 pixels. The SEM image is converted to monochrome 256 gradation and binarized by setting a threshold so that the solid particles and the binder are displayed in white and voids are displayed in black. The area of black pixels indicating voids with respect to the area of all pixels in the binarized cross-sectional image is obtained as the porosity.

Measurement is performed 5 times (5 SEM images) in any region on the cross-section of the composite layer by this operation, and the average is taken to calculate the porosity.

Similarly, also for the active material-containing layer of each electrode, measurement is performed 5 times (5 SEM images) in any region on the cross-section of the active material-containing layer using a binarized SEM image, and the average is taken to calculate the porosity.

(Measurement Method for pH of Aqueous Electrolyte)

A measurement method for the pH of the aqueous electrolyte is as follows.

The electrolyte is extracted from the discharged secondary battery with the exterior member opened, or the electrolyte contained in the electrode group taken out by disassembling the secondary battery is extracted. After measuring the liquid volume of the extracted electrolyte, the pH value is measured with a pH meter. The measurement of the pH value is performed, for example, as follows. In the measurement, for example, F-74 manufactured by HORIBA, Ltd. is used and the measurement is performed in an environment of 25±2° C. First, standard solutions of pH 4.0, 7.0, and 9.0 are prepared. Subsequently, F-74 is calibrated using these standard solutions. An appropriate amount of the electrolyte (electrolytic solution) to be measured is prepared and placed in a container, and the pH is measured. The sensor portion of F-74 is washed after measuring the pH. The above-mentioned procedures, that is, calibration, measurement, and washing are performed every time when another measurement target is measured.

The secondary battery according to the first embodiment includes the composite layer as the separator between the negative electrode and the positive electrode, and includes the aqueous electrolyte. The particle size distribution of the inorganic solid particles contained in the composite layer has at least two peaks. The frequency $FP_S$ of the peak located on the smallest particle diameter side and the frequency $FP_L$ of the peak located on the largest particle diameter side have a relationship of $0.9 \le FP_S/FP_L \le 5$. The porosity of the composite layer is less than both of the porosity of the negative electrode active material-containing layer and the porosity of the positive electrode active material-containing layer. The porosity of the composite layer is in a range of 1% or more and less than 15%. The secondary battery can exhibit high charge/discharge efficiency and high lifetime performance.

Second Embodiment

According to a second embodiment, an assembled battery is provided. The assembled battery includes a plurality of secondary batteries according to the first embodiment.

In an assembled battery according to the embodiment, respective single cells may be electrically connected and arranged in series or parallel, or may be arranged in a combination of series and parallel connections.

Next, an example of the assembled battery will be described with reference to the drawing.

Figure 9:
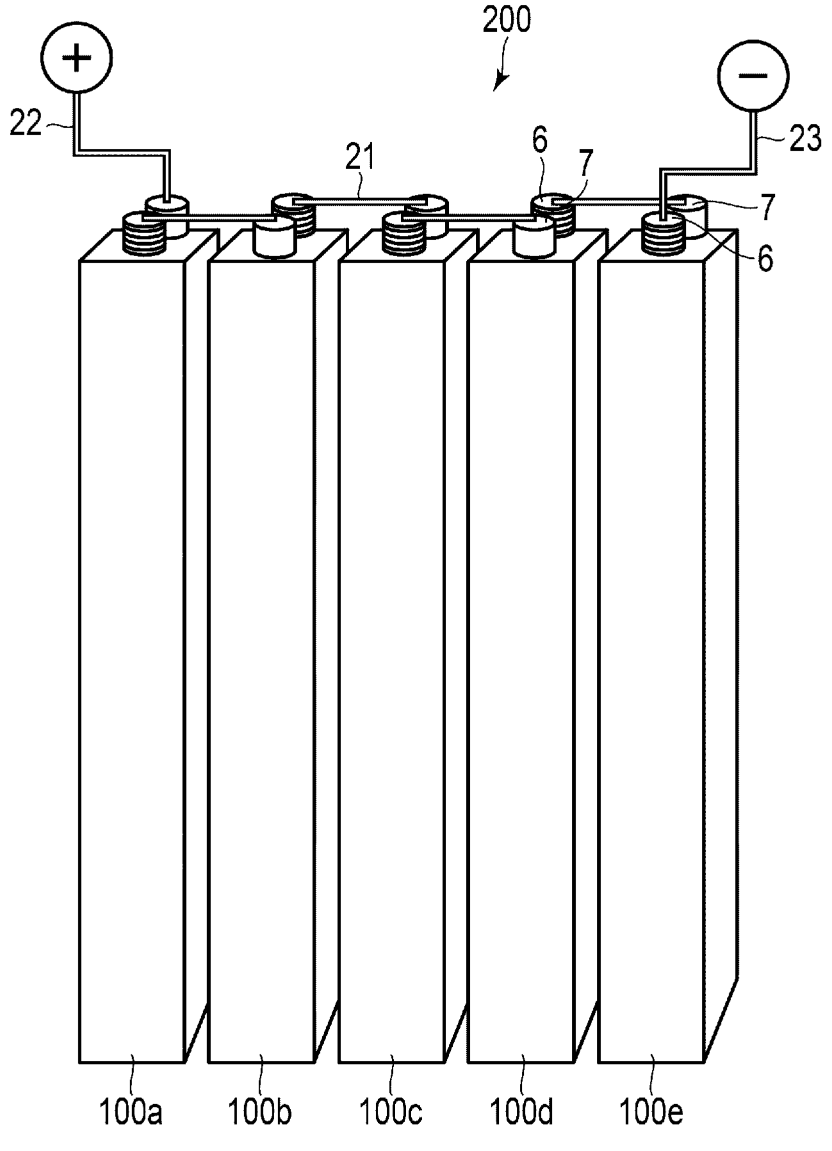
FIG. 9 is a perspective view schematically showing an example of an assembled battery according to an embodiment.

FIG. 9 is a perspective view schematically showing an example of the assembled battery according to the embodiment. An assembled battery 200 shown in FIG. 9 includes five single cells 100*a* to 100*e*, four bus bars 21, a positive electrode-side lead 22, and a negative electrode-side lead 23. Each of the five single cells 100*a* to 100*e* is the secondary battery according to the first embodiment.

The bus bar 21 connects, for example, the negative electrode terminal 6 of one single cell 100*a* to the positive electrode terminal 7 of the single cell 100*b* located adjacent thereto. In this way, the five single cells 100 are connected in series with the four bus bars 21. That is, the assembled battery 200 in FIG. 9 is a 5-series assembled battery. Although an example is not illustrated in the drawings, in an assembled battery including a plurality of single cells electrically connected in parallel, for example, a plurality of single cells may be electrically connected by connecting a plurality of negative electrode terminals with a bus bar and connecting a plurality of positive electrode terminals with a bus bar.

The positive electrode terminal 7 of at least one of the five single cells 100*a* to 100*e* is electrically connected to the positive electrode-side lead 22 for external connection. Further, the negative electrode terminal 6 of at least one of the five single cells 100*a* to 100*e* is electrically connected to the negative electrode-side lead 23 for external connection.

The assembled battery according to the second embodiment includes the secondary battery according to the first embodiment. Therefore, the assembled battery can exhibit high charge/discharge efficiency and high lifetime performance.

Third Embodiment

According to a third embodiment, a battery pack including the secondary battery according to the first embodiment is provided. This battery pack can include the assembled battery according to the second embodiment. This battery pack may include a single secondary battery according to the first embodiment instead of the assembled battery according to the second embodiment.

Such a battery pack can further include a protection circuit. The protection circuit has a function of controlling charge and discharge of the secondary battery. Alternatively, a circuit provided in an apparatus that uses the battery pack as a power supply (for example, an electronic apparatus, an automobile, etc.) may be used as the protection circuit of the battery pack.

In addition, the battery pack can further include an external terminal for energization. The external terminal for energization is for outputting an electric current from the secondary battery to the outside and/or for inputting an electric current from the outside to the secondary battery. In other words, when the battery pack is used as a power supply, an electric current is supplied to the outside through the external terminal for energization. Further, when the battery pack is charged, a charge current (including a regenerative energy of a motive power of an automobile or the like) is supplied to the battery pack through an external terminal for energization.

Next, an example of the battery pack according to the embodiment will be described with reference to the drawing.

Figure 10:
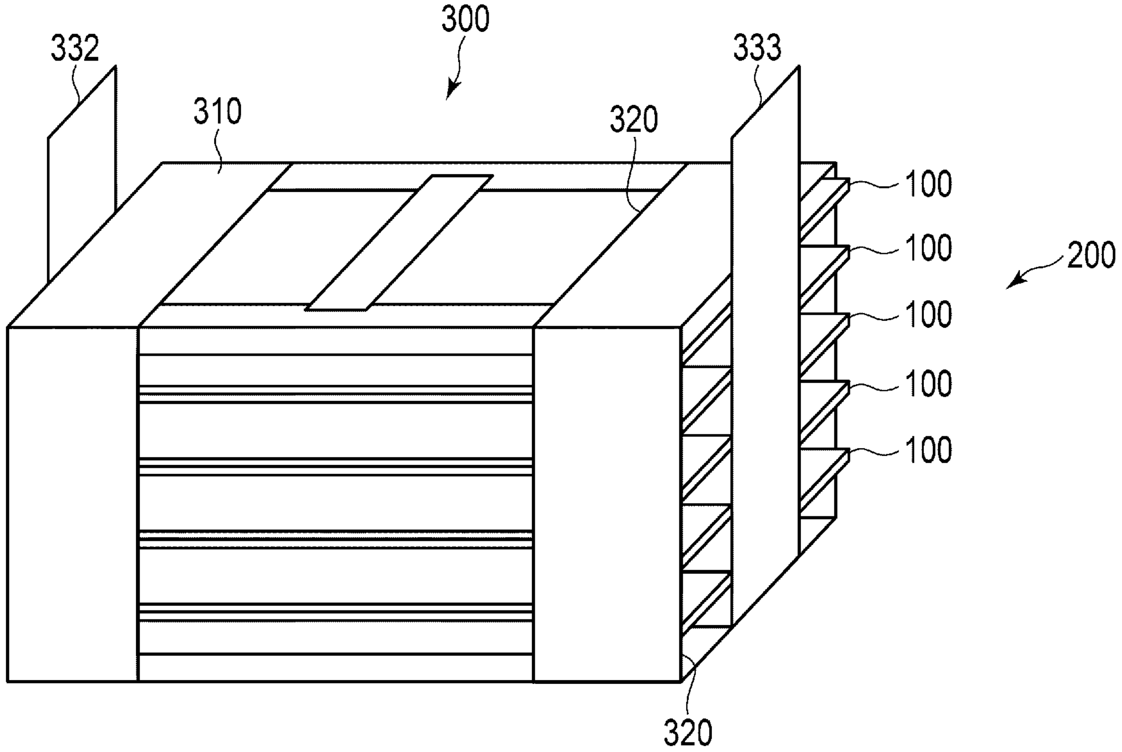
FIG. 10 is a perspective view schematically showing an example of a battery pack according to an embodiment.

FIG. 10 is a perspective view schematically showing an example of the battery pack according to the embodiment.

A battery pack 300 is provided with, for example, an assembled battery including the secondary batteries shown in FIGS. 7 and 8. The battery pack 300 includes a housing 310 and an assembled battery 200 housed in the housing 310. The assembled battery 200 is formed by electrically connecting a plurality of (for example, five) secondary batteries 100 in series. The secondary batteries 100 are stacked in the thickness direction. The housing 310 has an opening 320 on each of the top and four side faces. A side face from which a negative electrode terminal 6 and a positive electrode terminal 7 of the secondary battery 100 protrude is exposed to an opening 320 of the housing 310. A positive electrode terminal for output 332 of the assembled battery 200 has a strip shape, and one end is electrically connected to the positive electrode terminal 7 of any of the secondary batteries 100, and the other end protrudes from the opening 320 of the housing 310 and sticks out from the top of housing 310. On the other hand, a negative electrode terminal for output 333 of the assembled battery 200 has a strip shape, and one end is electrically connected to the negative electrode terminal 6 of any of the secondary batteries 100, and the other end protrudes from the opening 320 of the housing 310 and sticks out from the top of housing 310.

Figure 11:
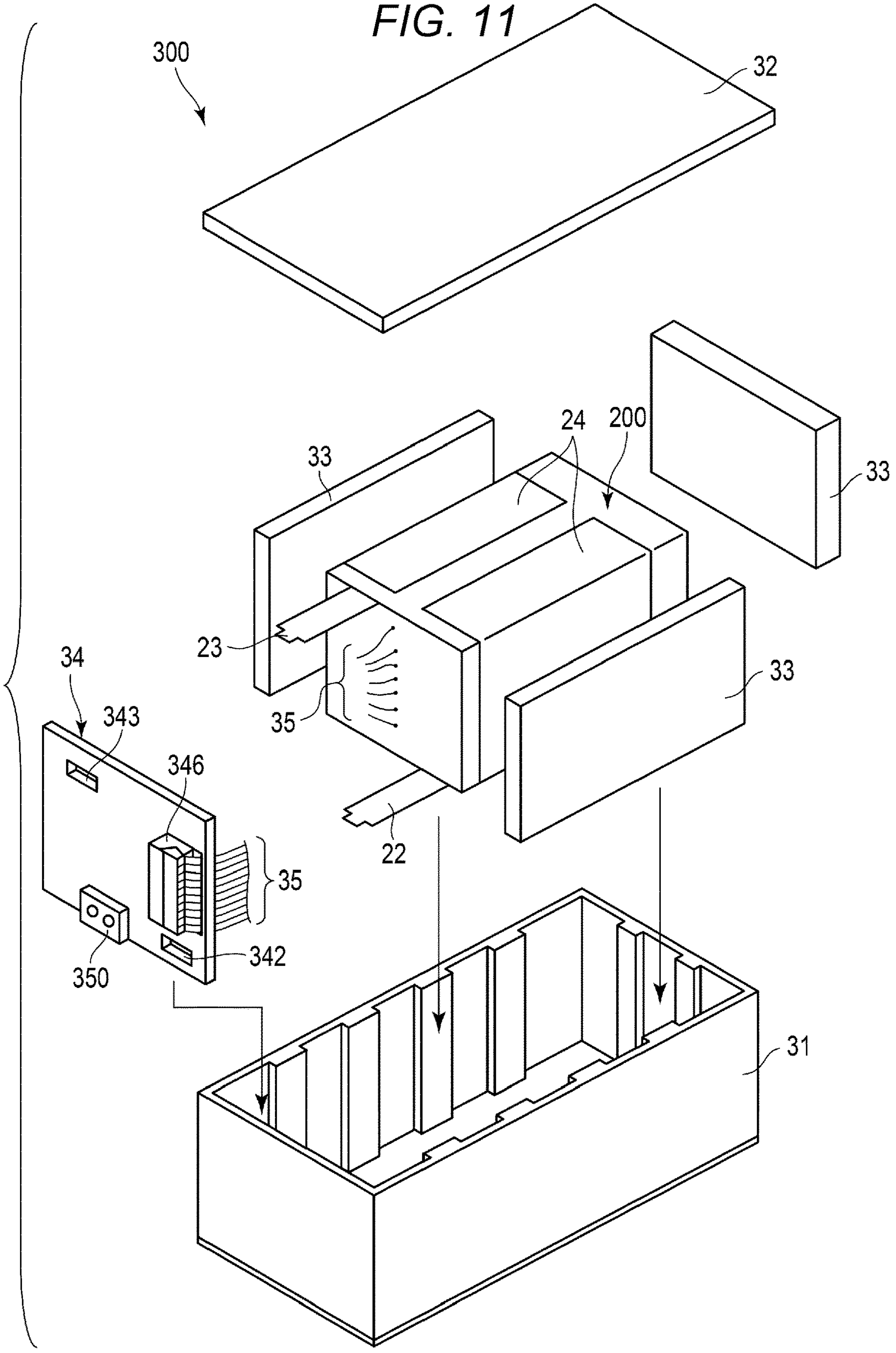
FIG. 11 is an exploded perspective view schematically showing another example of a battery pack according to the embodiment.
Figure 12:
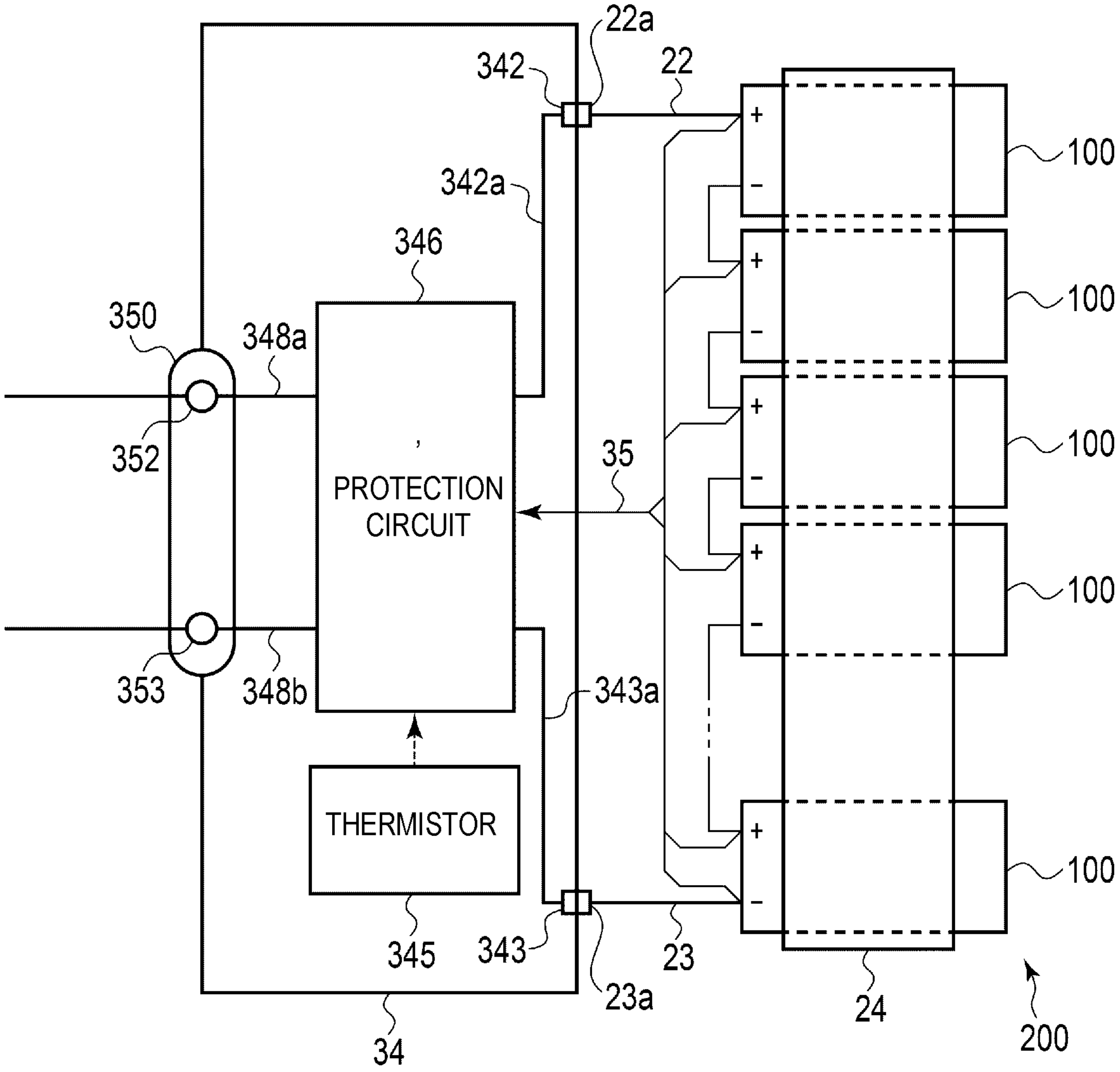
FIG. 12 is a block diagram showing an example of an electrical circuit of the battery pack shown in FIG. 11.

Another example of such a battery pack will be described in detail with reference to FIGS. 11 and 12. FIG. 11 is an exploded perspective view schematically showing another example of the battery pack according to the embodiment. FIG. 12 is a block diagram showing an example of an electrical circuit of the battery pack shown in FIG. 11.

The battery pack 300 shown in FIGS. 11 and 12 includes a housing container 31, a lid 32, a protective sheet 33, an assembled battery 200, a printed wiring board 34, a wiring harness 35, and an insulating plate (not shown).

The housing container 31 shown in FIG. 11 is a bottomed rectangular container having a rectangular bottom surface. The housing container 31 is configured to be able to house the protective sheet 33, the assembled battery 200, the printed wiring board 34, and the wiring harness 35. The lid 32 has a rectangular shape. The lid 32 covers the housing container 31, thereby housing the assembled battery 200 and the like. Although not shown in the drawing, the housing container 31 and the lid 32 are provided with an opening, a connection terminal, or the like for connection to an external apparatus or the like.

The assembled battery 200 includes a plurality of single cells 100, a positive electrode-side lead 22, a negative electrode-side lead 23, and an adhesive tape 24.

At least one of the plurality of single cells 100 is a secondary battery according to the embodiment. The respective plurality of single cells 100 are electrically connected in series as shown in FIG. 12. The plurality of single cells 100 may be electrically connected in parallel or in a combination of series and parallel. When the plurality of single cells 100 are connected in parallel, the battery capacity increases as compared with the case of series connection.

The adhesive tape 24 fastens the plurality of single cells 100. The plurality of single cells 100 may be fixed using a heat-shrinkable tape in place of the adhesive tape 24. In this case, the protective sheet 33 is placed on both side faces of the assembled battery 200, the heat-shrinkable tape is wrapped therearound, and then, the heat-shrinkable tape is heat-shrunk to bundle the plurality of single cells 100.

One end of the positive electrode-side lead 22 is connected to the assembled battery 200. One end of the positive electrode-side lead 22 is electrically connected to the positive electrode of one or more single cells 100. One end of the negative electrode-side lead 23 is connected to the assembled battery 200. One end of the negative electrode-side lead 23 is electrically connected to the negative electrode of one or more single cells 100.

The printed wiring board 34 is provided along a surface in a short-side direction among the inner surfaces of the housing container 31. The printed wiring board 34 includes a positive electrode-side connector 342, a negative electrode-side connector 343, a thermistor 345, a protection circuit 346, wirings 342*a* and 343*a*, an external terminal for energization 350, a plus-side wiring (positive-side wiring) 348*a*, and a minus-side wiring (negative-side wiring) 348*b*. One main surface of the printed wiring board 34 faces one side surface of the assembled battery 200. An insulating plate (not shown) is interposed between the printed wiring board 34 and the assembled battery 200.

The other end 22*a* of the positive electrode-side lead 22 is electrically connected to the positive electrode-side connector 342. The other end 23*a* of the negative electrode-side lead 23 is electrically connected to the negative electrode-side connector 343.

The thermistor 345 is fixed to one main surface of the printed wiring board 34. The thermistor 345 detects the temperature of each single cell 100 and transmits the detection signal to the protection circuit 346.

The external terminal for energization 350 is fixed to the other main surface of the printed wiring board 34. The external terminal for energization 350 is electrically connected to an apparatus that exists outside the battery pack 300. The external terminal for energization 350 includes a positive-side terminal 352 and a negative-side terminal 353.

The protection circuit 346 is fixed to the other main surface of the printed wiring board 34. The protection circuit 346 is connected to the positive-side terminal 352 via the plus-side wiring 348*a*. The protection circuit 346 is connected to the negative-side terminal 353 via the minus-side wiring 348*b*. In addition, the protection circuit 346 is electrically connected to the positive electrode-side connector 342 via the wiring 342*a*. The protection circuit 346 is electrically connected to the negative electrode-side connector 343 via the wiring 343*a*. Further, the protection circuit 346 is electrically connected to each of the plurality of single cells 100 via the wiring harness 35.

The protective sheets 33 are placed on both inner surfaces of the housing container 31 along the long-side direction and on the inner surface along the short-side direction facing the printed wiring board 34 across the assembled battery 200. The protective sheets 33 are made of, for example, a resin or a rubber.

The protection circuit 346 controls charge and discharge of the plurality of single cells 100. The protection circuit 346 also cuts off electric connection between the protection circuit 346 and the external terminal for energization 350 (positive-side terminal 352, negative-side terminal 353) to an external apparatus based on a detection signal transmitted from the thermistor 345 or a detection signal transmitted from each single cell 100 or the assembled battery 200.

Examples of the detection signal transmitted from the thermistor 345 include a signal detecting that the temperature of the single cell 100 is a predetermined temperature or higher. Examples of the detection signal transmitted from each single cell 100 or the assembled battery 200 include a signal detecting over-charge, over-discharge, or overcurrent of the single cell 100. When detecting over-charge or the like for each single cell 100, the battery voltage may be detected, or a positive electrode potential or a negative electrode potential may be detected. In the latter case, a lithium electrode to be used as a reference electrode is inserted into each single cell 100.

As the protection circuit 346, a circuit provided in an apparatus (for example, an electronic apparatus, an automobile, etc.) that uses the battery pack 300 as a power supply may be used.

As described above, the battery pack 300 includes the external terminal for energization 350. Therefore, the battery pack 300 can output an electric current from the assembled battery 200 to an external apparatus and input an electric current from an external apparatus to the assembled battery 200 through the external terminal for energization 350. In other words, when using the battery pack 300 as a power supply, an electric current from the assembled battery 200 is supplied to an external apparatus through the external terminal for energization 350. When charging the battery pack 300, a charge current from an external apparatus is supplied to the battery pack 300 through the external terminal for energization 350. When the battery pack 300 is used as a vehicle-mounted battery, a regenerative energy of a motive power of a vehicle can be used as the charge current from the external apparatus.

The battery pack 300 may include a plurality of assembled batteries 200. In this case, the plurality of assembled batteries 200 may be connected in series, in parallel, or in a combination of series and parallel. Further, the printed wiring board 34 and the wiring harness 35 may be omitted. In this case, the positive electrode-side lead 22 and the negative electrode-side lead 23 may be used as a positive-side terminal and a negative-side terminal, respectively, of the external terminal for energization.

Such a battery pack may be used, for example, in applications where excellent cycle performance is required when a large electric current is extracted. More specifically, the battery pack may be used as, for example, a power supply for an electronic apparatus, a stationary battery, or a vehicle-mounted battery for various types of vehicles. Examples of the electronic apparatus include a digital camera. The battery pack is particularly preferably used as a vehicle-mounted battery.

The battery pack according to the third embodiment includes the secondary battery according to the first embodiment or the assembled battery according to the second embodiment. Accordingly, the battery pack can exhibit high charge/discharge efficiency and high lifetime performance.

Fourth Embodiment

According to a fourth embodiment, a vehicle is provided. The vehicle is mounted with the battery pack according to the third embodiment.

In such a vehicle, the battery pack is, for example, configured to recover a regenerative energy of a motive power of the vehicle. The vehicle may include a mechanism (regenerator) that converts a kinetic energy of the vehicle into a regenerative energy.

Examples of the vehicle include a two-wheeled to four-wheeled hybrid electric automobile, a two-wheeled to four-wheeled electric automobile, an electrically assisted bicycle, and a railway car.

The mounting position of the battery pack in the vehicle is not particularly limited. For example, when the battery pack is mounted on an automobile, the battery pack can be mounted in the engine compartment of the vehicle, in the rear of the vehicle body, or under the seat.

The vehicle may be mounted with a plurality of battery packs. In this case, the batteries provided in each of the battery packs may be electrically connected in series, in parallel, or in a combination of series and parallel. For example, when each battery pack includes an assembled battery, the assembled batteries may be electrically connected in series, in parallel, or in a combination of series and parallel. Alternatively, when each battery pack includes a single battery, the batteries of the respective battery packs may be electrically connected in series, in parallel, or in a combination of series and parallel.

Next, an example of the vehicle according to the embodiment will be described with reference to the drawing.

Figure 13:
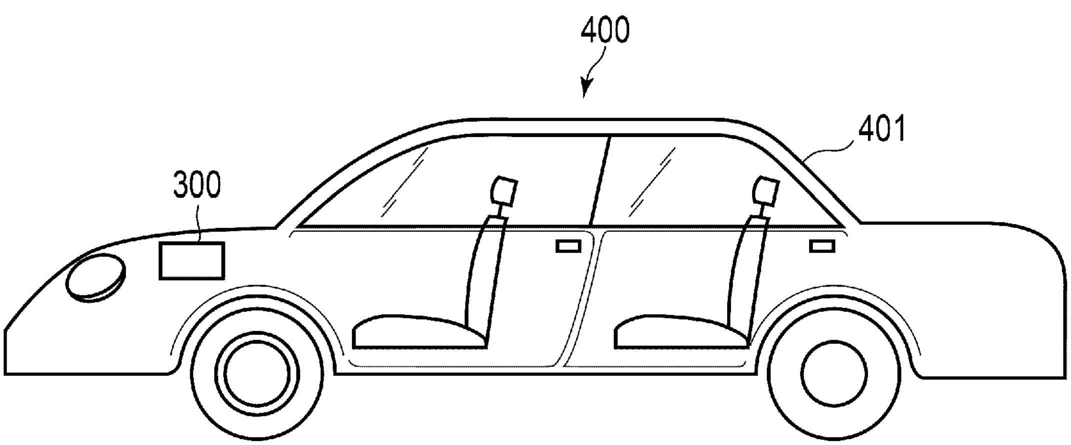
FIG. 13 is a partially perspective view schematically showing an example of a vehicle according to an embodiment.

FIG. 13 is a partially perspective view schematically showing an example of the vehicle.

A vehicle 400 shown in FIG. 13 includes a vehicle body 401 and the battery pack 300 according to the third embodiment. In the example shown in FIG. 13, the vehicle 400 is a four-wheeled automobile.

The vehicle 400 may be mounted with a plurality of battery packs 300. In this case, the batteries (for example, single cells or assembled batteries) provided in the battery packs 300 may be connected in series, in parallel, or in a combination of series and parallel.

In FIG. 13, an example in which the battery pack 300 is mounted in an engine compartment located at the front of the vehicle body 401 is shown. As described above, for example, the battery pack 300 may be mounted in the rear of the vehicle body 401, or under the seat. The battery pack 300 can be used as a power supply of the vehicle 400. The battery pack 300 can also recover a regenerative energy of a motive power of the vehicle 400.

The vehicle according to the fourth embodiment is mounted with the battery pack according to the third embodiment. Therefore, the vehicle has excellent driving performance and reliability.

Fifth Embodiment

According to a fifth embodiment, a stationary power supply including the battery pack according to the third embodiment is provided.

Such a stationary power supply may be mounted with the assembled battery according to the second embodiment or the secondary battery according to the first embodiment in place of the battery pack according to the third embodiment. Such a stationary power supply can exhibit high efficiency and long lifetime.

Figure 14:
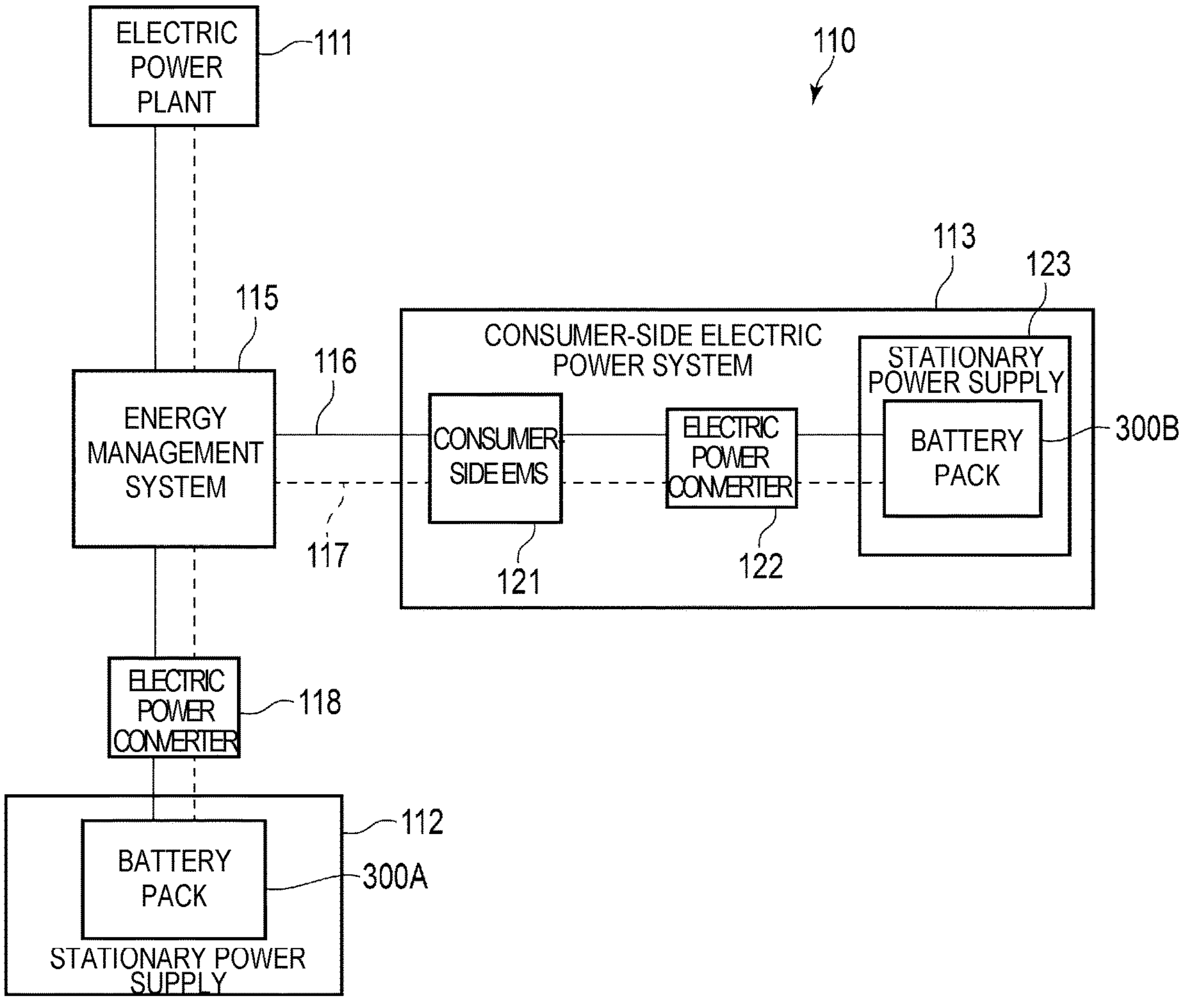
FIG. 14 is a block diagram showing an example of a system including a stationary power supply according to an embodiment.

FIG. 14 is a block diagram showing an example of a system including the stationary power supply according to the embodiment. FIG. 14 is a diagram showing, as a usage example of battery packs 300A and 300B according to the third embodiment, an application example thereof to stationary power supplies 112 and 123. In the illustrated example, a system 110 in which the stationary power supplies 112 and 123 are used is shown. The system 110 includes an electric power plant 111, the stationary power supply 112, a consumer-side electric power system 113, and an energy management system (EMS) 115. Further, an electric power network 116 and a communication network 117 are formed in the system 110, and the electric power plant 111, the stationary power supply 112, the consumer-side electric power system 113, and the EMS 115 are connected via the electric power network 116 and the communication network 117. The EMS 115 performs control to stabilize the entire system 110 by utilizing the electric power network 116 and the communication network 117.

The electric power plant 111 generates a large amount of electric power from a fuel source such as thermal power or nuclear power. Electric power is supplied from the electric power plant 111 through the electric power network 116 or the like. Further, the stationary power supply 112 is mounted with the battery pack 300A. The battery pack 300A can store electric power supplied from the electric power plant 111, or the like. In addition, the stationary power supply 112 can supply electric power stored in the battery pack 300A through the electric power network 116 or the like. The system 110 is provided with an electric power converter 118. The electric power converter 118 includes a converter, an inverter, a transformer, and the like. Therefore, the electric power converter 118 can perform conversion between a direct current and an alternating current, conversion between alternating currents of different frequencies, voltage transformation (step-up and step-down), and the like. Therefore, the electric power converter 118 can convert electric power from the electric power plant 111 into electric power that can be stored in the battery pack 300A.

The consumer-side electric power system 113 includes an electric power system for factories, an electric power system for buildings, an electric power system for home, and the like. The consumer-side electric power system 113 includes a consumer-side EMS 121, an electric power converter 122, and the stationary power supply 123. The stationary power supply 123 is mounted with the battery pack 300B. The consumer-side EMS 121 performs control to stabilize the consumer-side electric power system 113.

Electric power from the electric power plant 111 and electric power from the battery pack 300A are supplied to the consumer-side electric power system 113 through the electric power network 116. The battery pack 300B can store electric power supplied to the consumer-side electric power system 113. Similarly to the electric power converter 118, the electric power converter 122 includes a converter, an inverter, a transformer, and the like. Therefore, the electric power converter 122 can perform conversion between a direct current and an alternating current, conversion between alternating currents of different frequencies, voltage transformation (step-up and step-down), and the like. Thus, the electric power converter 122 can convert electric power supplied to the consumer-side electric power system 113 into electric power that can be stored in the battery pack 300B.

The electric power stored in the battery pack 300B can be used, for example, for charging a vehicle such as an electric automobile. Further, the system 110 may be provided with a natural energy source. In this case, the natural energy source generates electric power by a natural energy such as wind power and solar light. Then, electric power is supplied also from the natural energy source in addition to the electric power plant 111 through the electric power network 116.

EXAMPLES

Hereinafter, Examples will be described in detail.

Example 1

<Production of Negative Electrode>

A negative electrode was produced as follows. A negative electrode active material-containing slurry was prepared by dispersing a negative electrode active material, an electrically conductive agent, and a binder in an N-methyl-2-pyrrolidone (NMP) solvent. The proportions of the electrically conductive agent and the binder in the negative electrode active material-containing layer were set to 5 parts by mass and 1 part by mass, respectively, with respect to 100 parts by mass of the negative electrode active material. As the negative electrode active material, a lithium titanium oxide $Li_4Ti_5O_{12}$ powder (TLO) was used. As the electrically conductive agent, a graphite powder was used. As the binder, a polyvinylidene fluoride (PVdF) resin was used.

Subsequently, the prepared slurry was applied to both surfaces of a negative electrode current collector, and the coating film was dried, thereby forming a negative electrode active material-containing layer. As the negative electrode current collector, a Zn foil having a thickness of 50 μm was used. Here, when the slurry was applied to the Zn foil, the negative electrode active material-containing slurry was applied only to one surface of the Zn foil for a portion located in the outermost layer of the electrode group among the negative electrodes to be produced, and for the other portions, the negative electrode active material-containing slurry was applied to both surfaces of the Zn foil. At this time, the drying temperature of the negative electrode active material-containing slurry was 130° C., and the slurry application speed was 10 m/min.

<Production of Composite Layer>

Subsequently, inorganic solid particles and a polymeric material were mixed with N-methyl-2-pyrrolidone (NMP), thereby obtaining a slurry for forming a composite layer. As the inorganic solid particles, an alumina powder was used. In this case, inorganic solid particles that exhibit a distribution having at least two peaks in the particle size distribution were used. A particle diameter corresponding to the position of a peak top $P_S$ of a peak on the smallest particle diameter side (first particle diameter), and a particle diameter corresponding to the position of a peak top $P_L$ of a peak on the largest particle diameter side (second particle diameter) were 0.7 μm and 3 μm, respectively. As the polymeric material, a polyvinylidene fluoride (PVdF) resin was used. The volume ratio of the inorganic solid particles to the polymeric material was set to 64.6:35.4. The above-mentioned components were added to NMP and mixed, thereby preparing the slurry. This slurry was applied onto the surface of the negative electrode active material-containing layer on each surface of the negative electrode at an application speed of 10 m/min, and the resulting coating film was dried at a temperature of 130° C. Thereafter, the coating film was pressed, thereby obtaining a negative electrode that supports a composite layer (separator layer). The thickness of the composite layer at this time was 10 μm.

<Production of Positive Electrode>

A positive electrode active material, an electrically conductive agent, a binder, and a solvent were mixed, thereby preparing a slurry for producing a positive electrode. As the positive electrode active material, lithium manganese oxide $LiMn_2O_4$(LMO) was used. As the electrically conductive agent, a graphite powder was used. As the binder, polyvinylidene fluoride (PVdF) was used. As the solvent, N-methyl-2-pyrrolidone (NMP) was used. The mass ratio of the positive electrode active material, the electrically conductive agent, and the binder in the slurry was set to 100:5:5. This slurry for producing a positive electrode was applied to both surfaces of a 12 μm Ti foil used as a positive electrode current collector and dried. At this time, the drying temperature of the positive electrode active material-containing slurry was 130° C., and the slurry application speed was 10 m/min. The resulting stacked material was pressed, thereby obtaining a positive electrode.

(Production of Electrode Group>

The negative electrode that supports the composite layer and the positive electrode were stacked, thereby obtaining a stacked material. These electrodes were stacked so that the position of the composite layer as the separator layer is between the negative electrode active material-containing layer and the positive electrode active material-containing layer. The stacked material was spirally wound so that the negative electrode was located on the outermost periphery, and then pressed at 5 kN, thereby producing a flat electrode group.

<Battery Assembly>

The obtained electrode group was housed in a resin container made of polypropylene. Then, a 12 M LiCl aqueous solution prepared as an aqueous electrolyte was injected into the container, thereby producing a secondary battery.

Example 2

A secondary battery was produced in the same manner as in Example 1 except that the surface on which the composite layer is formed was changed from the surface of the negative electrode to the surface of the positive electrode (the surfaces of the positive electrode active material-containing layers on both sides).

Example 3

A secondary battery was produced in the same manner as in Example 1 except that the composite layer was formed not only on the surface of the negative electrode but also on the surface of the positive electrode.

Examples 4 to 13

Secondary batteries were produced in the same manner as in Example 1 except that the inorganic solid particles (alumina) used for the composite layer formed on the surface of the negative electrode were changed to ones in which the first particle diameter and the second particle diameter in the particle size distribution correspond to the positions of the peak tops $P_S$ and $P_L$ shown in Table 3 below, respectively, and the ratio of frequencies corresponding thereto ($FP_S/FP_L$) is as shown in Table 3.

Examples 14 to 16

Secondary batteries were produced in the same manner as in Example 1 except that the component ratio (volume ratio) of the inorganic solid particles (alumina) and the polymeric material (PVdF) used for the composite layer formed on the surface of the negative electrode was changed as shown in Table 1 below.

Examples 17 to 20

The material of the inorganic solid particles used for the composite layer formed on the surface of the negative electrode was changed to the material shown in Table 1, and the inorganic solid particles were changed to ones in which the first particle diameter and the second particle diameter in the particle size distribution correspond to the positions of the peak tops $P_S$ and $P_L$ shown in Table 3, respectively, and the ratio of frequencies corresponding thereto ($FP_S/FP_L$) is as shown in Table 3. In the table, LATP denotes $Li_{1.5}Al_{0.5}Ti_{1.5}(PO_4)_3$ and LLZ denotes $Li_7La_3Zr_2O_{12}$.

In addition, the component ratio (volume ratio) of the inorganic solid particles and the polymeric material was changed as shown in Table 1 below. Secondary batteries were produced in the same manner as in Example 1 except for these changes.

Example 21

A secondary battery was produced in the same manner as in Example 1 except that the active material used for the negative electrode was changed to $Nb_2TiO_7$ (TNO).

Example 22

A secondary battery was produced in the same manner as in Example 1 except that the active material used for the positive electrode was changed to $LiNi_{0.5}Co_{0.2}Mn_{0.3}O_2$ (NCM).

Comparative Examples 1 and 2

Secondary batteries were produced in the same manner as in Example 1 except that the inorganic solid particles (alumina) used for the composite layer formed on the surface of the negative electrode were changed to ones that exhibit a single peak as shown in Table 3 in the particle size distribution.

Comparative Example 3

A secondary battery was produced in the same manner as in Example 1 except that the formation of the composite layer on the surface of the negative electrode was omitted and a cellulose nonwoven fabric was used as the separator.

Comparative Examples 4 and 5

Secondary batteries were produced in the same manner as in Example 1 except that the inorganic solid particles used for the composite layer formed on the surface of the negative electrode were changed to ones in which the ratio of frequencies ($FP_S/FP_L$) corresponding to the respective peak tops $P_S$ and $P_L$ of the first particle diameter and the second particle diameter in the particle size distribution is as shown in Table 3.

Comparative Examples 6 and 7

Secondary batteries were produced in the same manner as in Example 1 except that the component ratio (volume ratio) of the inorganic solid particles (alumina) and the polymeric material (PVdF) used for the composite layer formed on the surface of the negative electrode was changed as shown in Table 2 below.

<Evaluation of Performance of Secondary Battery>

The charge/discharge efficiency was measured for the secondary batteries according to Examples 1 to 22 and Comparative Examples 1 to 7. Specifically, first, each secondary battery was charged in an environment of 25° C. at constant currents corresponding to 1-hour rate and 10-hour rate (1 C and 0.1 C), respectively, until the battery voltage reached 2.7 V. The state was maintained for 30 minutes. Thereafter, the battery was discharged at the same constant current as during charge until the battery voltage reached 2.1 V. The state was maintained for 30 minutes. A series of these operations was defined as one charge/discharge cycle, which was repeated 100 times. For each case of cycle at each rate, the discharge capacity and the charge capacity at the 100th cycle were measured, and the charge/discharge efficiency (discharge capacity/charge capacity) was calculated using the measured values. In addition, the capacity at the 100th cycle with respect to the initial capacity measured during initial charge and discharge, that is, the capacity retention ratio at the 100th cycle (discharge capacity at 100th cycle/discharge capacity at 1st cycle) was calculated and the lifetime performance was determined.

<Evaluation of Peel Strength>

After measuring the charge/discharge efficiency and the lifetime performance as described above, the secondary battery was discharged and disassembled by the method described above, the electrode group was taken out and washed, and the peel strength between respective members was measured by the surface/interface cutting method.

Specifically, for each secondary battery, the peel strength $\sigma_n$ between the negative electrode and the composite layer formed on the negative electrode and/or the peel strength $\sigma_p$ between the positive electrode and the composite layer formed on the positive electrode was measured. However, in Comparative Example 3, the cellulose nonwoven fabric was interposed between the positive and negative electrodes as the separator, and there was no composite layer, and therefore, the peel strength was assumed to be zero without performing measurement.

As a measurement apparatus, DN-GS manufactured by Daipla Wintes Co., Ltd. was used. A ceramic blade made of a borazon material having a blade width of 1.0 mm was used as the cutting blade. As the measurement conditions, a blade angle was set as follows: a rake angle of 20° and a relief angle of 10°.

<Measurement of Porosity>

The negative electrode and the positive electrode were separated from the electrode group taken out from the secondary battery while supporting the composite layer on each surface (if any). The porosity of each of the composite layers and the active material-containing layers was measured by the method described above using a sample obtained by subjecting the separated electrode to the process from washing to drying.

Tables 1 to 5 summarize the production conditions and various evaluation results of the secondary batteries according to Examples 1 to 22 and Comparative Examples 1 to 7.

The details of the materials used for the negative electrode, the positive electrode, and the composite layer in Examples 1 to 22 and Comparative Examples 1 to 7 are shown in Table 1 and Table 2, respectively. Specifically, the composition of the electrode active material and the composition of each composite layer are shown. As for the composition of the active material, $Li_4Ti_5O_{12}$ is denoted by "TLO", $Nb_2TiO_7$ is denoted by "TNO", $LiMn_2O_4$ is denoted by "LMO", and $LiNi_{0.5}Co_{0.2}Mn_{0.3}O_2$ is denoted by "NCM". As the composition of the composite layer, the material of the inorganic solid particles, the polymeric material, and the volume ratio thereof are shown. As for the material of the inorganic solid particles, $Li_{1.5}Al_{0.5}Ti_{1.5}(PO_4)_3$ is denoted by "LATP", alumina is denoted by "$Al_2O_3$", and $Li_7La_3Zr_2O_{12}$ is denoted by "LLZ". As for the polymeric material, polyvinylidene fluoride is denoted by "PVdF". In addition, for items in each table where not applicable, "-" is shown.

Table 3 and Table 4 provide further details regarding the negative electrode and further details regarding the positive electrode, respectively. Specifically, the details of peaks in the particle size distribution of the inorganic solid particles, the thickness and the porosity for each composite layer formed on each electrode, the porosity of the active material-containing layer, and the peel strengths $\sigma_n$ and $\sigma_p$ of the composite layer from the electrode are shown. As the details of the particle size distribution, the position of the peak top $P_S$ of the peak on the smallest particle diameter side, the position of the peak top $P_L$ of the peak on the largest particle diameter side, and the ratio of frequencies corresponding thereto $FP_S/FP_L$ are shown.

Table 5 shows the results of performance evaluation of the secondary batteries cycled at each rate. As the performance evaluation of the secondary batteries, the charge/discharge efficiency at the 100th charge/discharge cycle calculated as described above, the discharge capacity at the 100th cycle, and the lifetime performance evaluated based on the capacity retention ratio at the 100th cycle are shown.

TABLE 1

| | Negative electrode active material | Negative electrode-side composite layer: Inorganic solid particles (volume ratio) | Negative electrode-side composite layer: Polymeric material (volume ratio) | Positive electrode active material | Positive electrode-side composite layer: Inorganic solid particles (volume ratio) | Positive electrode-side composite layer: Polymeric material (volume ratio) |
|---|---|---|---|---|---|---|
| Example 1 | TLO | $Al_2O_3$ (64.6) | PVdF (35.4) | LMO | — | — |
| Example 2 | TLO | — | — | LMO | $Al_2O_3$ (64.6) | PVdF (35.4) |
| Example 3 | TLO | $Al_2O_3$ (64.6) | PVdF (35.4) | LMO | $Al_2O_3$ (64.6) | PVdF (35.4) |
| Example 4 | TLO | $Al_2O_3$ (64.6) | PVdF (35.4) | LMO | — | — |
| Example 5 | TLO | $Al_2O_3$ (64.6) | PVdF (35.4) | LMO | — | — |
| Example 6 | TLO | $Al_2O_3$ (64.6) | PVdF (35.4) | LMO | — | — |
| Example 7 | TLO | $Al_2O_3$ (64.6) | PVdF (35.4) | LMO | — | — |
| Example 8 | TLO | $Al_2O_3$ (64.6) | PVdF (35.4) | LMO | — | — |
| Example 9 | TLO | $Al_2O_3$ (64.6) | PVdF (35.4) | LMO | — | — |
| Example 10 | TLO | $Al_2O_3$ (64.6) | PVdF (35.4) | LMO | — | — |
| Example 11 | TLO | $Al_2O_3$ (64.6) | PVdF (35.4) | LMO | — | — |
| Example 12 | TLO | $Al_2O_3$ (64.6) | PVdF (35.4) | LMO | — | — |
| Example 13 | TLO | $Al_2O_3$ (64.6) | PVdF (35.4) | LMO | — | — |
| Example 14 | TLO | $Al_2O_3$ (72.1) | PVdF (27.9) | LMO | — | — |
| Example 15 | TLO | $Al_2O_3$ (79.6) | PVdF (20.4) | LMO | — | — |
| Example 16 | TLO | $Al_2O_3$ (57.8) | PVdF (42.2) | LMO | — | — |
| Example 17 | TLO | LATP (64.6) | PVdF (35.4) | LMO | — | — |
| Example 18 | TLO | LLZ (64.6) | PVdF (35.4) | LMO | — | — |
| Example 19 | TLO | $Al_2O_3$/LATP (56/14) | PVdF (30.0) | LMO | — | — |
| Example 20 | TLO | LATP/$Al_2O_3$ (47.8/20.5) | PVdF (31.7) | LMO | — | — |
| Example 21 | TNO | $Al_2O_3$ (64.6) | PVdF (35.4) | LMO | — | — |
| Example 22 | TLO | $Al_2O_3$ (64.6) | PVdF (35.4) | NCM | — | — |

TABLE 2

| | Negative electrode active material | Negative electrode-side composite layer: Inorganic solid particles (volume ratio) | Negative electrode-side composite layer: Polymeric material (volume ratio) | Positive electrode active material | Positive electrode-side composite layer: Inorganic solid particles (volume ratio) | Positive electrode-side composite layer: Polymeric material (volume ratio) |
|---|---|---|---|---|---|---|
| Comparative Example 1 | TLO | $Al_2O_3$ (64.6) | PVdF (35.4) | LMO | — | — |
| Comparative Example 2 | TLO | $Al_2O_3$ (64.6) | PVdF (35.4) | LMO | — | — |
| Comparative Example 3 | TLO | — | — | LMO | — | — |
| Comparative Example 4 | TLO | $Al_2O_3$ (64.6) | PVdF (35.4) | LMO | — | — |
| Comparative Example 5 | TLO | $Al_2O_3$ (64.6) | PVdF (35.4) | LMO | — | — |
| Comparative Example 6 | TLO | $Al_2O_3$ (93.6) | PVdF (6.4) | LMO | — | — |
| Comparative Example 7 | TLO | $Al_2O_3$ (49.2) | PVdF (50.8) | LMO | — | — |

TABLE 3

| | Position of peak top $P_S$ on smallest particle diameter side (μm) | Position of peak top $P_L$ on largest particle diameter side (μm) | Peak frequency ratio $FP_S/FP_L$ | Thickness of negative electrode-side composite layer (μm) | Porosity of negative electrode-side composite layer (%) | Porosity of negative electrode active material-containing layer (%) | Peel strength $\sigma_n$ at interface between negative electrode and composite layer (N/mm) |
|---|---|---|---|---|---|---|---|
| Example 1 | 0.7 | 3 | 1.8 | 13 | 4.5 | 13 | 0.61 |
| Example 2 | — | — | — | — | — | 13 | <0.1 |
| Example 3 | 0.7 | 3 | 1.8 | 10 | 4.5 | 12 | 0.61 |
| Example 4 | 0.3 | 3 | 1.6 | 14 | 5.1 | 13 | 0.53 |
| Example 5 | 0.8 | 3 | 1.8 | 15 | 7.1 | 12 | 0.62 |
| Example 6 | 0.7 | 1 | 2 | 13 | 3.6 | 12 | 0.63 |
| Example 7 | 0.7 | 4 | 2 | 17 | 6.8 | 13 | 0.65 |
| Example 8 | 0.3 | 1 | 1.6 | 12 | 3.4 | 13 | 0.46 |
| Example 9 | 0.8 | 1 | 1.9 | 12 | 5.5 | 13 | 0.69 |
| Example 10 | 0.3 | 4 | 2.1 | 16 | 7.6 | 12 | 0.45 |
| Example 11 | 0.8 | 4 | 2 | 16 | 8.3 | 13 | 0.68 |
| Example 12 | 0.7 | 3 | 0.9 | 15 | 10.4 | 13 | 0.71 |
| Example 13 | 0.7 | 3 | 5 | 14 | 3.9 | 13 | 0.39 |
| Example 14 | 0.7 | 3 | 1.8 | 14 | 7.1 | 12 | 0.46 |
| Example 15 | 0.7 | 3 | 1.8 | 13 | 14.5 | 14 | 0.31 |
| Example 16 | 0.7 | 3 | 1.8 | 13 | 2.6 | 13 | 0.76 |
| Example 17 | 0.8 | 2 | 1.1 | 13 | 4.1 | 13 | 0.63 |
| Example 18 | 0.7 | 2 | 1.3 | 13 | 3.9 | 13 | 0.62 |
| Example 19 | 0.7 | 2 | 1.7 | 12 | 3.8 | 12 | 0.6 |
| Example 20 | 0.8 | 3 | 1.8 | 14 | 4 | 12 | 0.63 |
| Example 21 | 0.7 | 3 | 1.8 | 13 | 4.5 | 13 | 0.63 |
| Example 22 | 0.7 | 3 | 1.8 | 13 | 4.5 | 13 | 0.61 |
| Comparative Example 1 | 0.7 | — | — | 12 | 9.6 | 13 | 0.52 |
| Comparative Example 2 | — | 3 | — | 13 | 12.4 | 13 | 0.71 |
| Comparative Example 3 | — | — | — | — | — | 13 | — |
| Comparative Example 4 | 0.7 | 3 | 0.85 | 14 | 13.6 | 12 | 0.69 |
| Comparative Example 5 | 0.7 | 3 | 5.3 | 13 | 3.1 | 13 | 0.29 |
| Comparative Example 6 | 0.7 | 3 | 1.8 | 13 | 15.9 | 13 | 0.25 |
| Comparative Example 7 | 0.7 | 3 | 1.8 | 12 | 0.4 | 13 | 0.81 |

TABLE 4

| | Position of peak top $P_S$ on smallest particle diameter side (μm) | Position of peak top $P_L$ on largest particle diameter side (μm) | Peak frequency ratio $FP_S/FP_L$ | Thickness of positive electrode-side composite layer (μm) | Porosity of positive electrode-side composite layer (%) | Porosity of positive electrode active material-containing layer (%) | Peel strength $\sigma_p$ at interface between positive electrode and composite layer (N/mm) |
|---|---|---|---|---|---|---|---|
| Example 1 | — | — | — | — | — | 10 | <0.1 |
| Example 2 | 0.7 | 3 | 1.8 | 13 | 4.5 | 10 | 0.53 |
| Example 3 | 0.7 | 3 | 1.8 | 10 | 4.5 | 10 | 0.51 |
| Example 4 | — | — | — | — | — | 10 | <0.1 |
| Example 5 | — | — | — | — | — | 10 | <0.1 |
| Example 6 | — | — | — | — | — | 10 | <0.1 |
| Example 7 | — | — | — | — | — | 10 | <0.1 |
| Example 8 | — | — | — | — | — | 10 | <0.1 |
| Example 9 | — | — | — | — | — | 10 | <0.1 |
| Example 10 | — | — | — | — | — | 10 | <0.1 |
| Example 11 | — | — | — | — | — | 10 | <0.1 |
| Example 12 | — | — | — | — | — | 10 | <0.1 |
| Example 13 | — | — | — | — | — | 10 | <0.1 |
| Example 14 | — | — | — | — | — | 10 | <0.1 |
| Example 15 | — | — | — | — | — | 10 | <0.1 |
| Example 16 | — | — | — | — | — | 10 | <0.1 |
| Example 17 | — | — | — | — | — | 10 | <0.1 |
| Example 18 | — | — | — | — | — | 10 | <0.1 |
| Example 19 | — | — | — | — | — | 10 | <0.1 |

TABLE 4-continued

| | Position of peak top $P_S$ on smallest particle diameter side (μm) | Position of peak top $P_L$ on largest particle diameter side (μm) | Peak frequency ratio $FP_S/FP_L$ | Thickness of positive electrode-side composite layer (μm) | Porosity of positive electrode-side composite layer (%) | Porosity of positive electrode active material-containing layer (%) | Peel strength $\sigma_p$ at interface between positive electrode and composite layer (N/mm) |
|---|---|---|---|---|---|---|---|
| Example 20 | — | — | — | — | — | 10 | <0.1 |
| Example 21 | — | — | — | — | — | 10 | <0.1 |
| Example 22 | — | — | — | — | — | 10 | <0.1 |
| Comparative Example 1 | — | — | — | — | — | 10 | <0.1 |
| Comparative Example 2 | — | — | — | — | — | 10 | <0.1 |
| Comparative Example 3 | — | — | — | — | — | 10 | — |
| Comparative Example 4 | — | — | — | — | — | 10 | <0.1 |
| Comparative Example 5 | — | — | — | — | — | 10 | <0.1 |
| Comparative Example 6 | — | — | — | — | — | 10 | <0.1 |
| Comparative Example 7 | — | — | — | — | — | 10 | <0.1 |

TABLE 5

| | 1-hour rate | | | 10 hour-rate | | |
|---|---|---|---|---|---|---|
| | Charge/discharge efficiency (%) | Discharge capacity (mAh/g) | Lifetime performance (%) | Charge/discharge efficiency (%) | Discharge capacity (mAh/g) | Lifetime performance (%) |
| Example 1 | 96 | 150 | 95 | 93 | 153 | 96 |
| Example 2 | 88 | 136 | 90 | 84 | 133 | 89 |
| Example 3 | 96 | 146 | 94 | 93 | 150 | 94 |
| Example 4 | 95 | 135 | 95 | 88 | 148 | 94 |
| Example 5 | 90 | 149 | 91 | 82 | 135 | 91 |
| Example 6 | 92 | 148 | 94 | 90 | 148 | 94 |
| Example 7 | 88 | 143 | 90 | 81 | 121 | 89 |
| Example 8 | 91 | 140 | 92 | 88 | 145 | 91 |
| Example 9 | 91 | 150 | 91 | 89 | 143 | 91 |
| Example 10 | 87 | 141 | 90 | 80 | 132 | 85 |
| Example 11 | 85 | 141 | 90 | 75 | 123 | 83 |
| Example 12 | 85 | 139 | 86 | 79 | 129 | 80 |
| Example 13 | 88 | 142 | 78 | 80 | 132 | 74 |
| Example 14 | 93 | 151 | 92 | 91 | 150 | 93 |
| Example 15 | 85 | 138 | 79 | 70 | 119 | 70 |
| Example 16 | 92 | 118 | 90 | 88 | 122 | 88 |
| Example 17 | 95 | 150 | 96 | 90 | 148 | 96 |
| Example 18 | 95 | 149 | 95 | 91 | 148 | 96 |
| Example 19 | 96 | 150 | 95 | 92 | 146 | 95 |
| Example 20 | 95 | 151 | 94 | 92 | 147 | 93 |
| Example 21 | 92 | 250 | 91 | 88 | 241 | 90 |
| Example 22 | 95 | 152 | 93 | 91 | 145 | 91 |
| Comparative Example 1 | 92 | 141 | 61 | 67 | 64 | 45 |
| Comparative Example 2 | 76 | 105 | 51 | 51 | 48 | 37 |
| Comparative Example 3 | 72 | 95 | 31 | 35 | 39 | 0 |
| Comparative Example 4 | 86 | 129 | 75 | 69 | 80 | 54 |
| Comparative Example 5 | 80 | 118 | 68 | 53 | 40 | 34 |
| Comparative Example 6 | 74 | 121 | 77 | 40 | 56 | 41 |
| Comparative Example 7 | 91 | 37 | 21 | 82 | 53 | 20 |

In Comparative Example 3, the electrode group in which the electrodes without forming a composite layer were stacked with the cellulose non-woven fabric as the separator interposed therebetween was used. Therefore, for Comparative Example 3, all the items indicating the composite layer are shown as "-". From the comparison of Comparative Example 3 in which a composite layer is not formed on the electrode with Comparative Examples 1 and 2 in which a composite layer is formed on the electrode, it is found that the formation of the composite layer is more effective for both of the charge/discharge efficiency and the lifetime performance. In Comparative Example 3, as compared with Comparative Examples 1 and 2, both of the efficiency and the lifetime performance deteriorated, and it is inferred that many side reactions due to electrolysis of water during charge and discharge occurred, and it is found that the side reactions are reduced by forming the composite layer on the surface of the electrode.

In comparison of Comparative Examples 1 and 2 with Comparative Examples 4 and 5, it is found that by making the particle size distribution of the insulating inorganic solid particles used for the composite layer at least bimodal, the lifetime performance is improved while maintaining the charge/discharge efficiency.

From the evaluation results of the battery performance shown in Table 5, it is found that the secondary batteries produced in Examples 1 to 22 have higher efficiency and lifetime performance during low-rate charge and discharge than the secondary batteries produced in Comparative Examples 1 to 7.

In Examples 1 to 22, except for Examples 2 and 3, the composite layer was formed on the negative electrode but not formed on the positive electrode, and therefore, the peel strength $\sigma_p$ between the positive electrode and the composite layer showed a numerical value of 0.1 N/mm or less. Further, in these examples, the peel strength $\sigma_n$ between the negative electrode and the composite layer showed a numerical value of 0.3 N/mm or more. On the other hand, in Example 2 in which the composite layer was formed on the positive electrode instead of on the negative electrode, $\sigma_p$ showed a numerical value of 0.3 N/mm or more and on showed a numerical value of 0.1 N/mm or less. Further, in Example 3 in which the composite layer was formed on both positive and negative electrodes, both an and op showed a numerical value of 0.3 N/mm or more. That is, in the electrode with the composite layer formed thereon, a peel strength of 0.3 N/mm or more was exhibited at the interface between the composite layer and the electrode, and in the case of only simple stacking, the interfacial peel strength was 0.1 N/mm or less, which showed the results that the members were not bonded.

In comparison of Example 1 with Example 2, it is inferred that the efficiency and the lifetime are higher when the composite layer is formed on the negative electrode, and the negative electrode is more prone to side reactions. Nevertheless, it is found that in Example 2 as well, both efficiency and lifetime are significantly improved by forming the composite layer as compared with Comparative Example 3.

As can be seen from comparison of Examples 1 to 22 with Comparative Examples 1 and 2, by making the particle size distribution of the insulating inorganic solid particles forming the composite layer at least bimodal, and setting the ratio of the frequencies $FP_S$ and $FP_L$ of the peak top $P_S$ of the smallest particle diameter and the peak top $P_L$ of the largest particle diameter as follows: $FP_S/FP_L \geq 0.9$, the efficiency during low-rate cycling was further improved.

In comparison of Example 1 with Examples 4 to 11, when the position of the peak top $P_S$ on the small particle diameter side was shifted to a smaller particle diameter, or the position of the peak top $P_L$ on the large particle diameter side was shifted to a larger particle diameter, there was a slight drop in efficiency at a low rate. In the meantime, when the particle diameter of the inorganic solid particles having a small particle diameter becomes smaller, the bending degree of the flow channel in the composite layer shifts to a smaller value, which makes it easier for the liquid to flow into the composite layer. As a result, it seems that the side reaction between water and the electrode could not be reduced so much. On the other hand, there was an increase in porosity as the particle diameter of the inorganic solid particles having a large particle diameter further increased, and therefore, it seems that due to the increase in the amount of the liquid contained in the pores, the side reaction between water and the electrode could not be reduced so much either. Nevertheless, in Examples 4 to 11, as compared with Comparative Examples 1 and 2, significantly high efficiency and lifetime performance were obtained especially at a low rate, and therefore, it is found that the formation of the composite layer on both of the negative electrode and the positive electrode is effective in improving the lifetime performance.

In addition, also in comparison of Example 1 with Examples 12 and 13, when the $FP_S/FP_L$ decreases, the large particle diameter ratio increases, leading to an increase in porosity, and on the other hand, when the $FP_S/FP_L$ becomes extremely large, the particle size distribution approaches a monomodal distribution, and the bending degree of the flow channel in the composite layer decreases, resulting in an increase in liquid flow, and therefore, the performance deteriorates slightly. Nevertheless, in Examples 12 and 13, a marked improvement in performance can be seen when compared with Comparative Examples 1 and 2.

In Examples 14 to 16, the proportion of the polymeric material (binder) in the composite layer is changed. The porosity increases with a decrease in the proportion of the binder. In the meantime, when the proportion of the binder is set to 20.4 vol %, a composite layer having a porosity of 14.5% is obtained, and there is a decrease in performance as compared with Example 1, but the performance is significantly improved as compared with Comparative Examples 1 and 2 (Example 15). On the other hand, when the proportion of the binder was set to 42.2 vol %, the proportion of the binder penetrating into voids in the composite layer increased and the porosity decreased, resulting in a decrease in capacity (Example 16). This is likely due to an increase in battery resistance, but good performance is exhibited in terms of efficiency and lifetime. However, as shown in Comparative Examples 6 and 7, when the amount of the binder is extremely small or large, the porosity also shows an extreme value. On the other hand, when the proportion of the binder was 6.4 vol %, the porosity was 15.9%, and the composite layer could not exhibit the effect of reducing liquid flow, and a significant deterioration in performance was observed (Comparative Example 6). On the other hand, when the proportion of the binder was 50.8 vol %, the porosity was 0.4%, and a decrease in capacity and lifetime accompanying a significant increase in battery resistance was observed (Comparative Example 7).

From the comparison of Examples 1 to 13 with Examples 17 to 20, it is found that the above-mentioned effect is obtained even if the inorganic solid particles used for the composite layer are not alumina. Further, the effect is obtained similarly even when the electrode active material is different as in Examples 21 and 22.

As described above, from comparison of Examples 1 to 22 with Comparative Examples 1 to 7, it is found that when the particle size distribution of the insulating particles forming the composite layer has at least two peaks, and among the peaks, by setting the ratio of the size of the peak of the smallest particle diameter to the size of the peak of the largest particle diameter to 0.9 or more and 5 or less, a secondary battery with good charge/discharge efficiency and lifetime performance can be provided.

According to one or more embodiments and examples described above, a secondary battery including a negative electrode, a positive electrode, a separator, and an aqueous electrolyte is provided. The negative electrode includes a negative electrode active material-containing layer. The positive electrode includes a positive electrode active material-containing layer. The separator is located between the negative electrode and the positive electrode, and includes a composite layer containing inorganic solid particles and a polymeric material. A particle size distribution of the inorganic solid particles in the composite layer has at least two peaks. A frequency $FP_S$ of a peak top $P_S$ of a peak of a smallest particle diameter and a frequency $FP_L$ of a peak top $P_L$ of a peak of a largest particle diameter have a relationship of $0.9 \leq FP_S/FP_L \leq 5$. A porosity of the composite layer is less than both of a porosity of the negative electrode active material-containing layer and a porosity of the positive electrode active material-containing layer, and is 1% or more and less than 15%. According to the above-mentioned configuration, a secondary battery and a battery pack exhibiting high charge/discharge efficiency and high lifetime performance, and a vehicle and a stationary power supply including the battery pack can be provided.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

Hereinafter, some embodiments according to the present disclosure will be appended.

[1] A secondary battery provided with a negative electrode including a negative electrode active material-containing layer, a positive electrode including a positive electrode active material-containing layer, a separator located between the negative electrode and the positive electrode and including a composite layer containing inorganic solid particles and a polymeric material, and an aqueous electrolyte, wherein a particle size distribution of the inorganic solid particles in the composite layer has at least two peaks, a frequency $FP_S$ of a peak top $P_S$ of a peak on a smallest particle diameter side and a frequency $FP_L$ of a peak top $P_L$ of a peak on a largest particle diameter side in the particle size distribution have a relationship of $0.9 \leq FP_S/FP_L \leq 5$, and a porosity of the composite layer is less than both of a porosity of the negative electrode active material-containing layer and a porosity of the positive electrode active material-containing layer, and is 1% or more and less than 15%.

[2] The secondary battery according to [1], wherein the composite layer is joined to at least one of the negative electrode and the positive electrode, and at least one of a peel strength $\sigma_n$ between the negative electrode and the composite layer is greater than 0.3 N/mm, or a peel strength $\sigma_p$ between the positive electrode and the composite layer is greater than 0.3 N/mm.

[3] The secondary battery according to [1] or [2], wherein a position of the peak top $P_S$ is in a range of 0.3 μm or more and 0.8 μm or less, and a position of the peak top $P_L$ is in a range of 1 μm or more and 4 μm or less.

[4] The secondary battery according to any one of [1] to [3], wherein a content of the polymeric material in the composite layer is 20 vol % or more.

[5] The secondary battery according to any one of [1] to [4], wherein the negative electrode includes a negative electrode active material containing a compound having a lithium ion intercalation/deintercalation potential of 1 V or more and 3 V or less (vs. $Li/Li^+$) with respect to a lithium redox potential.

[6] A battery pack including the secondary battery according to any one of [1] to [5].

[7] The battery pack according to [6] further including an external terminal for energization and a protection circuit.

[8] The battery pack according to [6] or [7], wherein the battery pack includes a plurality of the secondary batteries, and the plurality of secondary batteries are electrically connected in series, in parallel, or in a combination of series and parallel.

[9] A vehicle including the battery pack according to any one of [6] to [8].

[10] The vehicle according to [9] including a mechanism that converts a kinetic energy of the vehicle into a regenerative energy.

[11] A stationary power supply including the battery pack according to any one of [6] to [8].

What is claimed is:

1. A secondary battery comprising:

a negative electrode including a negative electrode active material-containing layer;

a positive electrode including a positive electrode active material-containing layer;

a separator located between the negative electrode and the positive electrode and including a composite layer containing inorganic solid particles and a polymeric material; and an aqueous electrolyte, wherein a particle size distribution of the inorganic solid particles in the composite layer has at least two peaks, a frequency $FP_S$ of a peak top $P_S$ of a peak on a smallest particle diameter side and a frequency $FP_L$ of a peak top $P_L$ of a peak on a largest particle diameter side in the particle size distribution have a relationship of $0.9 \leq FP_S/FP_L \leq 5$, and a porosity of the composite layer is less than both of a porosity of the negative electrode active material-containing layer and a porosity of the positive electrode active material-containing layer, and is 1% or more and less than 15%.

2. The secondary battery according to claim 1, wherein:

the composite layer is joined to at least one of the negative electrode and the positive electrode, and at least one of:

a peel strength $\sigma_n$ between the negative electrode and the composite layer is greater than 0.3 N/mm, or a peel strength $\sigma_p$ between the positive electrode and the composite layer is greater than 0.3 N/mm.

3. The secondary battery according to claim 2, wherein both of the peel strength $\sigma_p$ and the peel strength $\sigma_p$ are greater than 0.3 N/mm.

4. The secondary battery according to claim 1, wherein a position of the peak top $P_S$ is in a range of 0.3 μm or more and 0.8 μm or less, and a position of the peak top $P_L$ is in a range of 1 μm or more and 4 μm or less.

5. The secondary battery according to claim 1, wherein a content of the polymeric material in the composite layer is 20 vol % or more.

6. The secondary battery according to claim 1, wherein the negative electrode includes a negative electrode active material containing a compound having a lithium ion intercalation/deintercalation potential of 1 V or more and 3 V or less (vs. $Li/Li^+$) with respect to a lithium redox potential.

7. A battery pack comprising the secondary battery according to claim 1.

8. The battery pack according to claim 7 further comprising an external terminal for energization and a protection circuit.

9. The battery pack according to claim 7, wherein the battery pack includes a plurality of the secondary batteries, and the plurality of secondary batteries are electrically connected in series, in parallel, or in a combination of series and parallel.

10. A vehicle comprising the battery pack according to claim 7.

11. The vehicle according to claim 10 including a mechanism that converts a kinetic energy of the vehicle into a regenerative energy.

12. A stationary power supply comprising the battery pack according to claim 7.

* * * * *